United States Patent
Gouko et al.

(10) Patent No.: US 10,982,973 B2
(45) Date of Patent: Apr. 20, 2021

(54) POSITION CHANGE MEASURING DEVICE

(71) Applicant: DENSO CORPORATION, Kariya (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP); Masahiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 277 days.

(21) Appl. No.: 16/149,272

(22) Filed: Oct. 2, 2018

(65) Prior Publication Data

US 2019/0101412 A1    Apr. 4, 2019

(30) Foreign Application Priority Data

Oct. 3, 2017  (JP) .............................. JP2017-193655

(51) Int. Cl.
| | |
|---|---|
| *G01D 5/00* | (2006.01) |
| *G01D 5/12* | (2006.01) |
| *G01K 17/20* | (2006.01) | 
| *G01D 5/48* | (2006.01) |

(52) U.S. Cl.
CPC ................. *G01D 5/00* (2013.01); *G01D 5/12* (2013.01); *G01K 17/20* (2013.01); *G01D 5/48* (2013.01)

(58) Field of Classification Search
CPC .. G01D 5/00; G01D 5/12; G01D 5/48; G01K 17/20; G01P 5/10; G01P 15/008; G01P 15/0897
See application file for complete search history.

(56) References Cited

U.S. PATENT DOCUMENTS

| | | | | |
|---|---|---|---|---|
| 4,466,295 A | * | 8/1984 | Wesson ................. | G01D 5/344 324/207.23 |
| 4,858,470 A | * | 8/1989 | Kincaid .................. | G01H 1/00 73/654 |

(Continued)

FOREIGN PATENT DOCUMENTS

| | | |
|---|---|---|
| JP | 2006-284340 A | 10/2006 |
| JP | 2008-134182 A | 6/2008 |

(Continued)

*Primary Examiner* — Nathaniel T Woodward
*Assistant Examiner* — Philip L Cotey
(74) *Attorney, Agent, or Firm* — Harness, Dickey & Pierce, P.L.C.

(57) ABSTRACT

A position change measuring device which measures a change in position of a target object and includes a base member, a press member which is movable following a change in position of the target object, an elastic member which produces heat when contracting or absorbs heat when expanding, a heat flux sensor which outputs a signal as a function of a rate of heat flux transferred inside or outside the elastic member, and a diaphragm unit which is made of elastically deformable material. The diaphragm unit is retained by the base member in contact with the press member and works to produce force of resilience to recover the elastic member to its initial state when the elastic member contracts or expands in response to movement of the press member. This structure improves a response rate for sensing a change in position of the target object with high accuracy.

7 Claims, 14 Drawing Sheets

(56) References Cited

U.S. PATENT DOCUMENTS

| | | | | |
|---|---|---|---|---|
| 6,439,765 | B2* | 8/2002 | Smith | G01G 3/13 |
| | | | | 374/31 |
| 6,832,522 | B2* | 12/2004 | Schaefer | G01L 1/20 |
| | | | | 73/715 |
| 6,973,837 | B2* | 12/2005 | Barnett | G01D 3/022 |
| | | | | 73/765 |
| 2002/0194922 | A1* | 12/2002 | Schaefer | G01L 1/20 |
| | | | | 73/720 |
| 2014/0286373 | A1* | 9/2014 | Thresher | G01K 17/20 |
| | | | | 374/29 |
| 2015/0201694 | A1* | 7/2015 | Boyce | G08B 21/182 |
| | | | | 340/539.12 |
| 2016/0109286 | A1* | 4/2016 | Yazaki | H01L 35/32 |
| | | | | 73/649 |
| 2016/0351774 | A1* | 12/2016 | Schneider | A63B 21/00 |
| 2016/0351775 | A1* | 12/2016 | Schneider | A63B 21/00 |
| 2020/0173869 | A1* | 6/2020 | Negishi | G01L 3/08 |

FOREIGN PATENT DOCUMENTS

| | | |
|---|---|---|
| JP | 2009-229183 A | 10/2009 |
| JP | 2018146562 A | 9/2018 |
| JP | 2019007878 A | 1/2019 |

\* cited by examiner

POSITION CHANGE MEASURING DEVICE

CROSS REFERENCE TO RELATED DOCUMENT

The present application claims the benefit of priority of Japanese Patent Application No. 2017-193655 filed on Oct. 3, 2017, the disclosure of which is incorporated herein by reference.

BACKGROUND

1 Technical Field

This disclosure relates generally to a position change measuring device.

2 Background Art

Position change measuring devices are known which measure a change in position of a target object relative to a reference position. For example, Japanese Patent First Publication No. 2009-229183 discloses a strain-crack measuring device equipped with a displacement sensor, two securing members attached to ends of the displacement sensor, and two base plates joined to the securing members. The strain-crack measuring device works to measure a change in relative position of two places separate at a given interval from each other.

The strain-crack measuring device, however, has the drawback in that the base plates are located at a distance away from each other and attached to a target object, thus resulting in a risk that the size of a strain-crack measured may be changed depending upon a positional relation between the base plates. Therefore, when the strain-crack measuring device is attached to the target object several times in order to search for a suitable position thereof, it may result in a change in output characteristic of the strain-crack measuring device with each attachment thereof. It is, thus, difficult to obtain reproducible data.

Position change measuring devices are known which measure a rate and a direction of heat flux in an elastic member which is deformed in response to a change in position of a target object relative to a reference to calculate such a position change. After being deformed, the elastic member is recovered only by its own force of resilience to its original shape and size. Such recovery is, therefore, slow, which will result in a decrease in response rate for sensing a change in position of the target object. In order to increase the response rate, it is necessary to increase the stiffness of the elastic member, which, however, results in a difficulty in detecting a small change in position of the target object. Usually, the elastic member is relatively low in stiffness. This may result in accidental deformation of the elastic member when subjected to the weight of a target object upon installation of the position change measuring device on the target object, which leads to a decreased measurement accuracy of the position change measuring device.

SUMMARY

It is therefore an object of this disclosure to provide a position change measuring device which improves a response rate for sensing a position of a target object and accuracy of such sensing.

According to one aspect of this disclosure, there is provided a position change measuring device which measures a change in position of a target object relative to a reference. The position change measuring device comprises: (a) a base which is held from moving relative to the reference; (b) a follower which is moved following movement of the target object relative to the reference; (c) an expandable/contractable member which is disposed between the base and the follower and made of material which contracts or expands in response to movement of the follower, when contracting the expandable/contractable member producing heat, when expanding, the expandable/contractable member absorbing heat; (d) a heat flux sensor to which the heat is transferred from the expandable/contractable member and which outputs a signal as a function of a rate of heat flux that is a flow of thermal energy transferred inside or outside the expandable/contractable member; and (e) a resilience force generator which is made of elastically deformable material. The resilience force generator is disposed between the base and the follower, retained by the base, and joined to the follower. When the expandable/contractable member contracts or expands in response to the movement of the follower, the resilience force generator works to produce a force of resilience in addition to a force of resilience exerted by the expandable/contractable member on the follower, to urge the follower to an initial state thereof.

The resilience force generator is, as described above, made of elastically deformable material which is separate from the expandable/contractable member. When strain energy of the target object is changed by application of external force, it will cause the follower to be moved. The movement of the follower causes the resilience force generator to contract or expand along with the expandable/contractable member. When the external force disappears, the force of resilience, as produced by the expandable/contractable member, and force of resilience, as created by elastic force of the resilience force generator act on the follower.

In other words, the resilience force generator assists the expandable/contractable member in urging the follower to the initial state thereof. This results in a quick recovery of the position change measuring device, thereby enhancing a response rate of the position change measuring device for measuring a change in position of the target object.

The position change measuring device also works to minimize undesirable movement or deformation of the follower with the aid of stiffness of both the expandable/contractable member and the resilience force generator when the external force is exerted on the follower through the target object. This eliminates a risk that the follower is undesirably moved or deformed when subjected to unwanted excessive external force, thereby ensuring a high degree of accuracy in measuring a change in position of the target object.

The position change measuring device is, therefore, capable of enhancing the response rate of sensing a change in position of the target object using the force of resilience produced by and stiffness of the resilience force generator and also improving the accuracy in sensing such a position change.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

Figure 1:
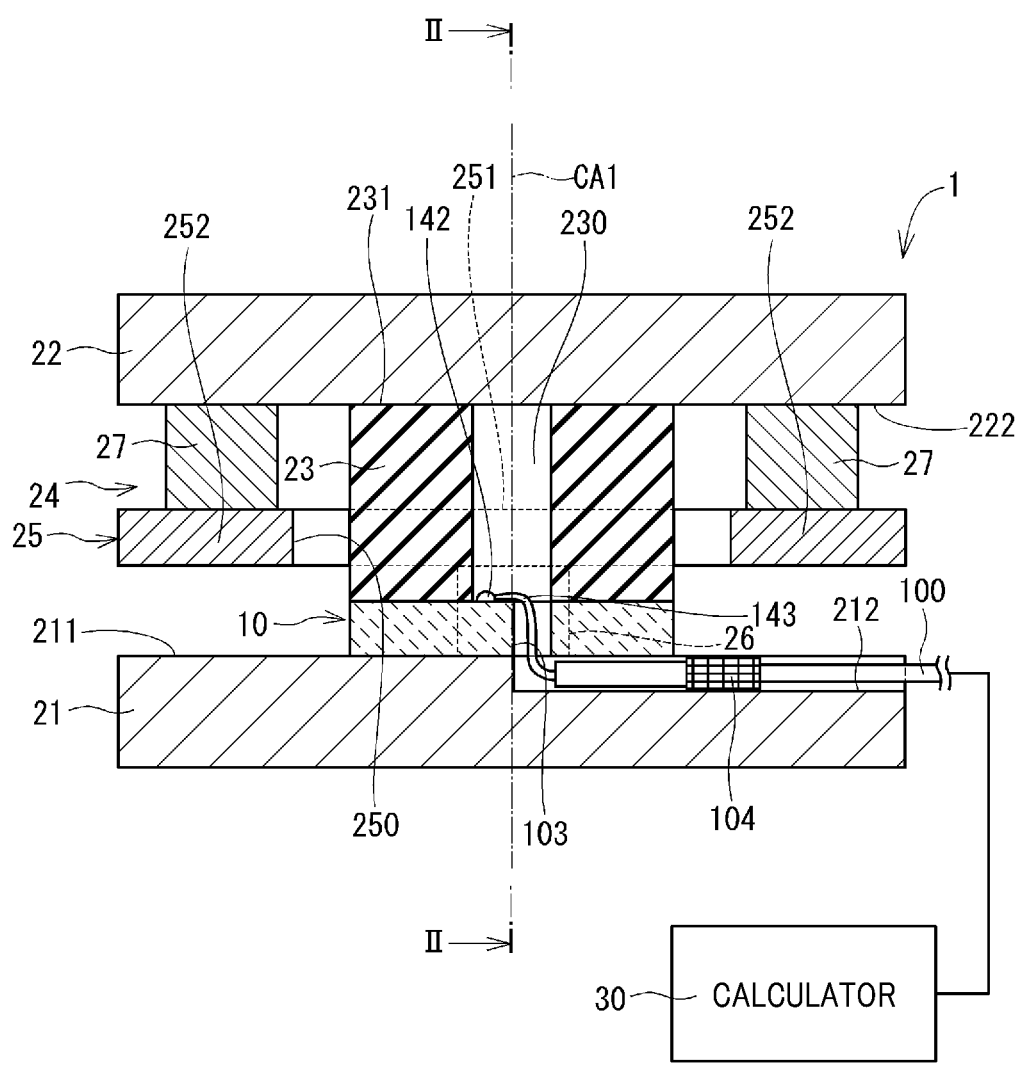
FIG. 1 is a longitudinal sectional view which illustrates a position change measuring device according to the first embodiment.

The position change measuring device 1 according to the first embodiment will be described below with reference to FIGS. 1 to 8. The position change measuring device 1 includes the base member 21, the press member 22 working as a follower, the elastic member 23 serving as an expandable/contractable member, the heat flux sensor 10, the diaphragm unit 24 working as a resilience force generator, and the calculator 30. FIGS. 1, 2, 6, and 7 are different in vertical and horizontal scale of the position change measuring device 1 from actual for ease of visibility.

Figure 7:
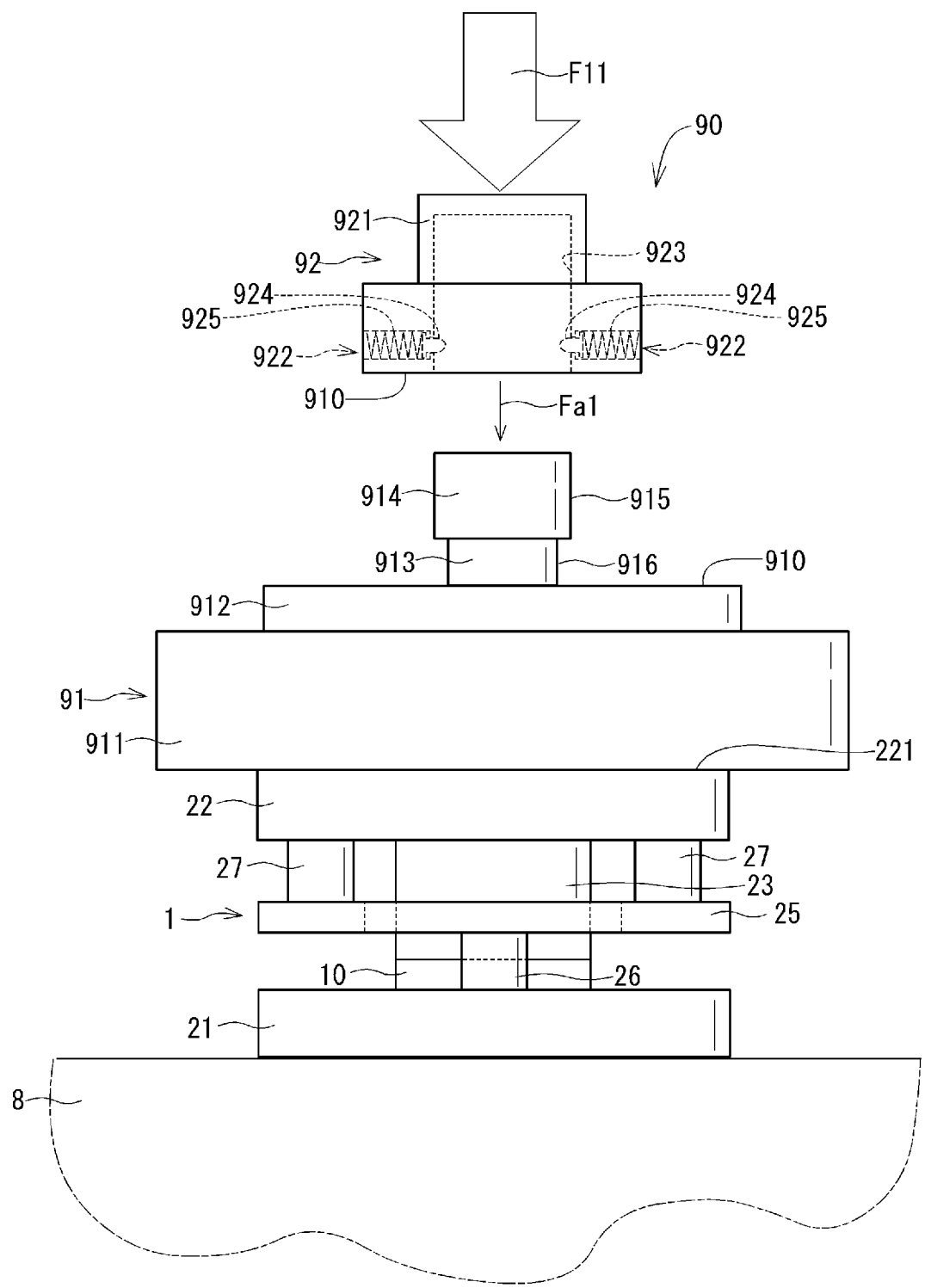
FIG. 7 is a schematic view which illustrates how to use a position change measuring device according to the first embodiment.

The base member 21 is formed by a flat plate made of electrically conductive material. The base member 21 is of a circular shape. The base member 21 is, as illustrated in FIG. 7, placed on the table 8 used as a reference and firmly secured thereto so that it is held from moving relative to the table 8. The base member 21 has the surface 211 which faces the press member 22 and on which the heat flux sensor 10 is mounted. The surface 11 has the groove 212 formed therein. The groove 212 extends from substantially the center of the base member 21 to an outer circumferential edge thereof. The groove 212 has arranged therein the cable 100 of the heat flux sensor 10 which will be described later in detail.

The press member 22 is formed by a flat plate made of electrically conductive and elastically deformable material (e.g., resin or rubber) or metallic material (e.g., iron steel). The press member 22 is of a circular shape and has a size identical with that of the base member 21. The press member 22 is pressed against, for example, the target object 90 demonstrated in FIG. 7 so that it is movable relative to the base member 21 following movement or deformation of the target object 90. When being made of elastic material, the press member 22 is deformed as well as being moved in response to movement or deformation of the target object 90. Such deformation absorbs undesirable orientation of the target object 90 relative to the position change measuring device 1. The press member 22 is attached to the elastic member 23 using, for example, adhesive.

The elastic member 23 is made of, for example, Viton rubber. The elastic member 23 has the surface 231 farther away from the base member 21 and is attached to the surface 222 of the press member 22 using, for example, adhesive. The elastic member 23 has the through-hole 230 formed therein. The through-hole 230 is contoured to the shape of the sensing device 101 of the heat flux sensor 10 (which will be described later in detail) and has a length extending along the center axis CA1 of the position sensing device 1. The elastic member 23 contracts or expands in response to movement or deformation of the press member 22 relative to the base member 21. Specifically, when contracting, the elastic member 23 produces heat. Alternatively, when expanding, the elastic member 23 absorbs heat.

The heat flux sensor 10 is disposed between the elastic member 23 and the base member 21. Specifically, the heat flux sensor 10 is attached to the elastic member 23 and the base member 21 using, for example, adhesive. The heat flux sensor 10 is made of flexible material so that it is deformable in response to contraction or expansion of the elastic member 23. In the first embodiment, the heat flux sensor 10 is, as can be seen in a top view of FIG. 3, of a circular shape. The heat flux sensor 10 is subjected to a heat flux that is a flow of thermal energy moving between inside and outside the elastic member 23. The heat flux sensor 10 works to measure the heat flux crossing itself and output it in the form of an electrical voltage signal.

The heat flux sensor 10 is equipped with the sensing device 101 and the terminal unit 102.

Figure 3:
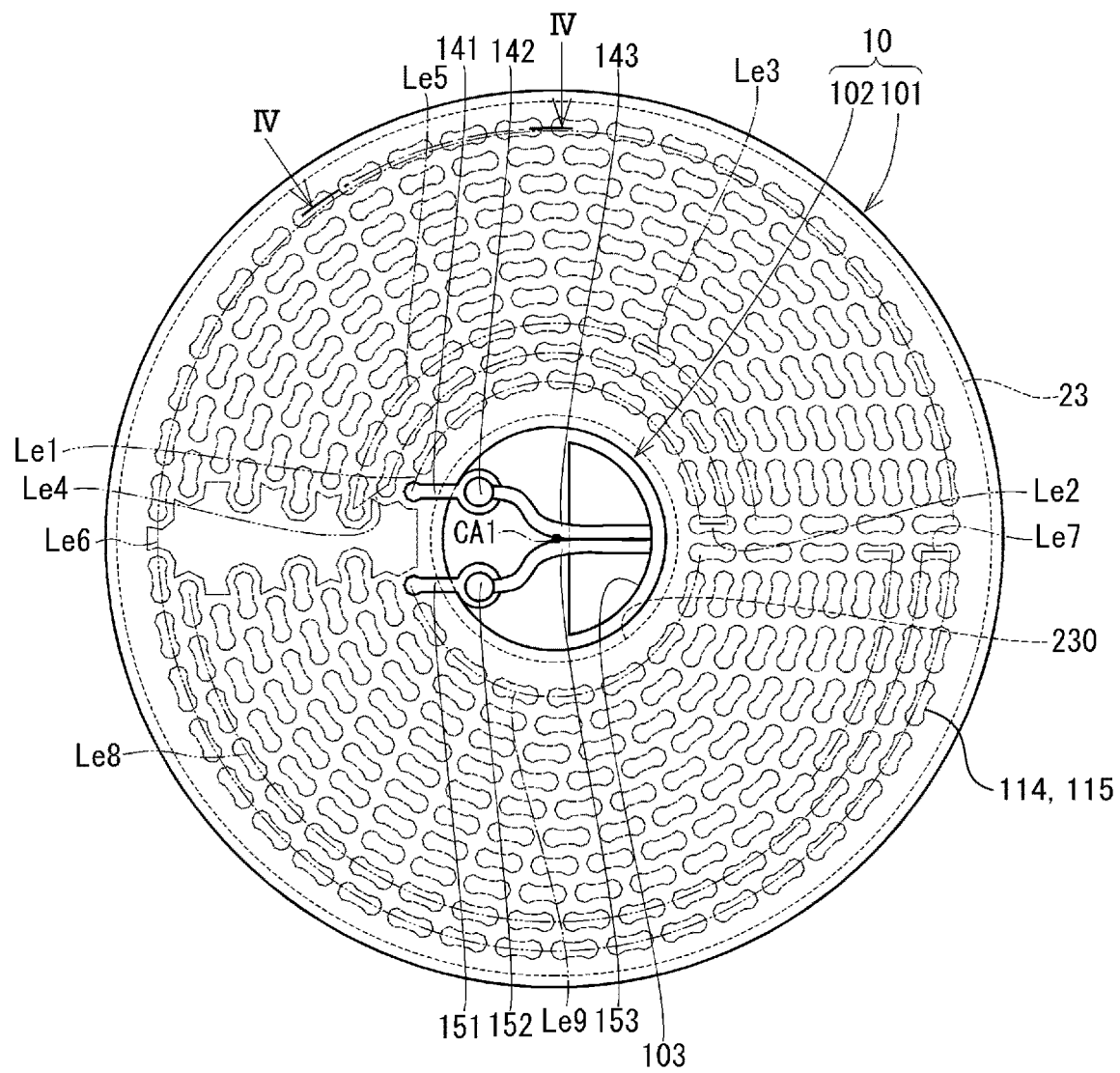
FIG. 3 is a schematic view which illustrates a heat flux sensor installed in the position change measuring device in FIG. 1.
Figure 4:
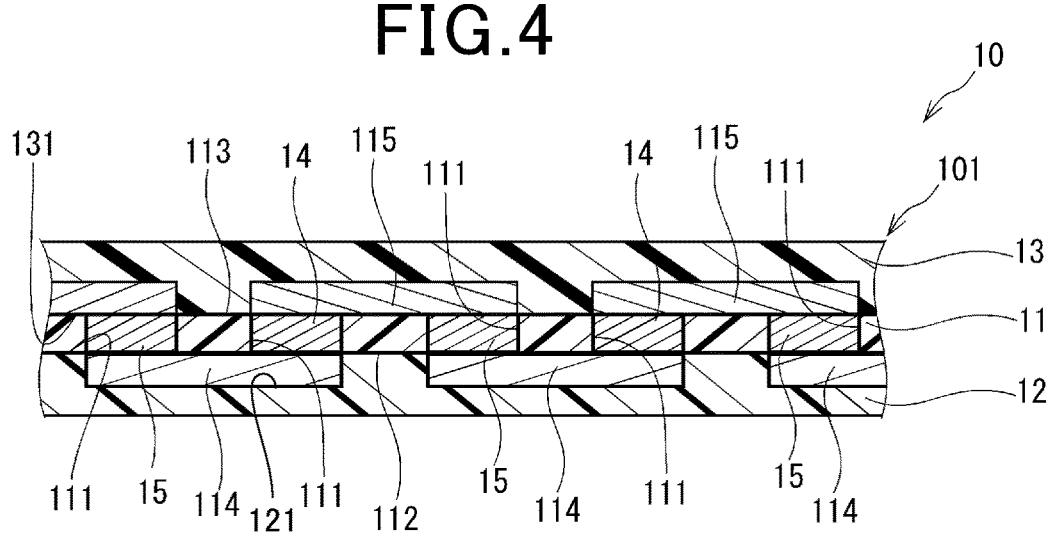
FIG. 4 is a sectional view taken along the line IV-IV in FIG. 3.

The heat flux sensor 10, as used in this disclosure, may be implemented by one of various types of heat flux sensor known in the art or on the market. The sensing device 101 of the heat flux sensor 10 in this embodiment is, as can be seen in FIG. 3, arranged in an annular shape. The sensing device 101, as illustrated in FIG. 4, includes the insulating substrate 11, the back-side protective member 12, the front-side protective member 13, the first layer-to-layer connecting members 14, and the second layer-to-layer connecting members 15. FIG. 4 enlarges the scale of the parts upward, i.e., from the back-side protective member 12 to the front-side protective member 13 for the ease of visibility of the structure of the sensing device 101

The insulating substrate 11 is made of thermoplastic resin film. The insulating substrate 11 has a plurality of via holes 111 passing through a thickness thereof. The via holes 111 have the first layer-to-layer connecting members 14 or the second layer-to-layer connecting members 15 disposed therein. Specifically, ones of the via holes 111 (which will also be referred to below as first via holes) have the first layer-to-layer connecting members 14 mounted therein. Ones of the via holes 111 (which will also be referred to below as second via holes) located adjacent the first via holes 111 have the second layer-to-layer connecting members 15 mounted therein. In other words, the insulating substrate 11 has the first layer-to-layer connecting members 14 and the second layer-to-layer connecting members 15 which are arranged alternately.

The back-side protective member 12 is made of thermoplastic resin film and has the same size as that of the insulating substrate 11. The back-side protective member 12 is arranged on the back surface 112 of the insulating substrate 11. The back-side protective member 12 has the surface 121 which faces the insulating substrate 11 on which a plurality of back-side patterns made of copper foil are formed. The back-side patterns 114 electrically connect between the first layer-to-layer connecting members 14 and the second layer-to-layer connecting members 15.

The front-side protective member 13 is made of thermoplastic resin film and has the same size as that of the insulating substrate 11. The front-side protective member 13 is arranged on the surface 113 of the insulating substrate 11. The front-side protective member 13 has the surface 131 which faces the insulating substrate 11 and on which a plurality of front-side patterns 115 made of copper foil are formed. The front-side patterns 115 electrically connect between the first layer-to-layer connecting members 14 and the second layer-to-layer connecting members 15.

The first layer-to-layer connecting members 14 are made from a metallic material which is different in type from the metallic material from which the second layer-to-layer connecting members 15 are made in order to exhibit the Seebeck effect. For example, the first layer-to-layer connecting members 14 are each made of metallic alloy formed by solid-state sintering P-type Bi—Sb—Te alloy powder so as to maintain the original crystal structures of the metallic atoms. The second layer-to-layer connecting members 15 are each made of metallic alloy formed by solid-state sintering N-type Bi—Te alloy powder so as to keep crystal structures of the metallic atoms as they are. The first layer-to-layer connecting members 14 and the second layer-to-layer connecting members 15 are alternately connected in series with each other by the back-side patterns 114 and the front-side patterns 115.

Figure 5:
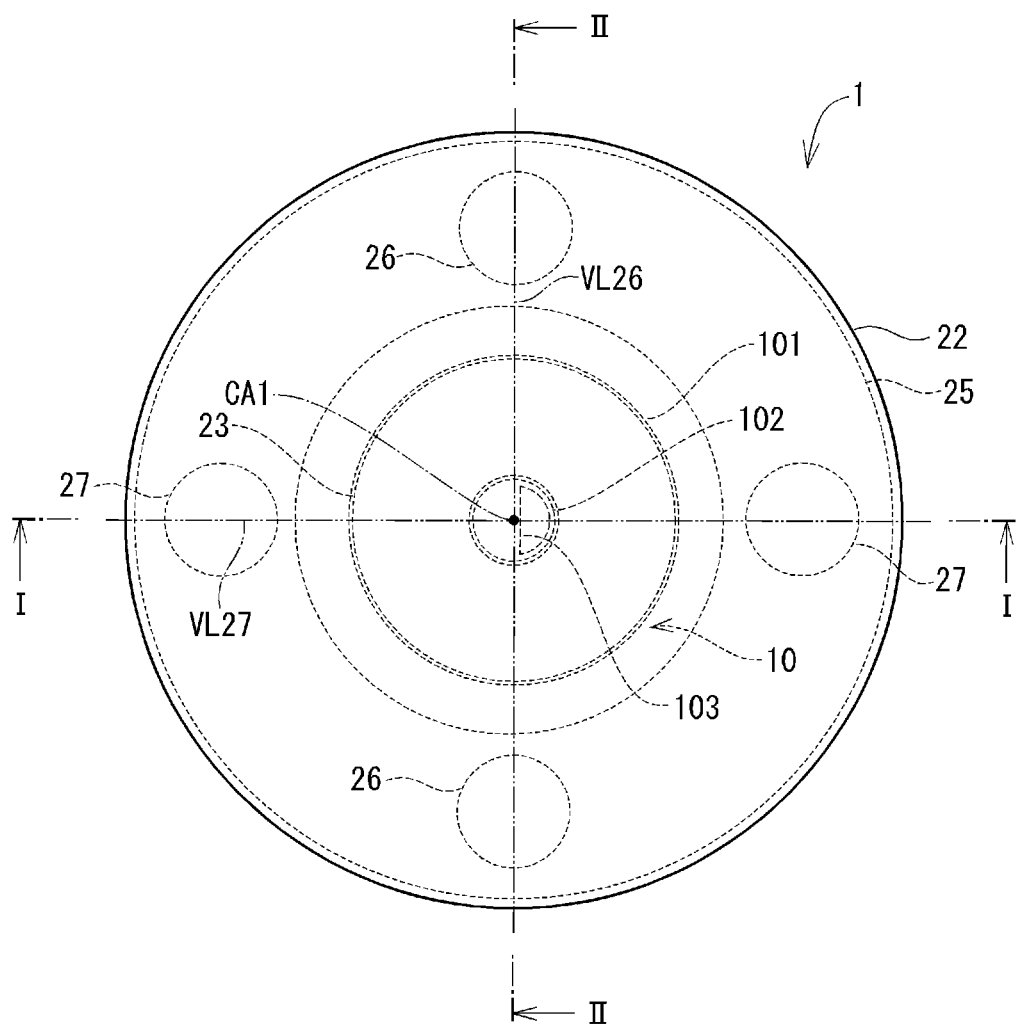
FIG. 5 is a top view of a position change measuring device according to the first embodiment.

In the sensing device 101, each of the back-side patterns 114, each of the first layer-to-layer connecting members 14, each of the front-side patterns 115, and each of the second layer-to-layer connecting members 15 are electrically connected in this order, that is, an order from the back-side pattern 114, to the first layer-to-layer connecting member 14, to the front-side pattern 115, and then to the second layer-to-layer connecting member 15. In the following discussion, a conductive line made up of a plurality of discrete conductors: the back-side patterns 114, the first layer-to-layer connecting members 14, the front-side patterns 115, and the second layer-to-layer connecting members 15 will be referred to as a sensing conductive line of the sensing device 101. The elastic member 23 is, as can be seen in FIGS. 3 and 5, arranged adjacent an end of the sensing conductive line which is close to the press member 22.

The sensing conductive line of the heat flux sensor 10, as clearly illustrated in FIG. 3, includes a plurality of arc-shaped groups of conductors and conductors (which will also be referred to below as connecting conductors) which are arranged linearly in the radial direction of the heat flux sensor 10 and each of which connects every adjacent two of the arc-shaped groups of conductors. Each of the conductors illustrated in the shape gourd in FIG. 3 represents either of the back-side pattern 114 or the front-side pattern 115 depending upon a transverse section of the heat flux sensor 10. Note that FIG. 4 is a sectional view taken in a thickness-wise direction of the heat flux sensor 10 along the line IV-IV in FIG. 3.

Specifically, in FIG. 3 which is a top plan of the heat flux sensor 10 illustrated in FIG. 4 when viewed from the press member 22, a radially innermost one of the arc-shaped groups of the conductors, as indicated by a two-dot chain line Le1 and referred to below as an innermost sensing conductive line or a first sensing conductive line, is electrically connected to an adjacent one of the arc-shaped groups of the conductors, as indicated by a two-dot chain line Le3 and referred to below as a second sensing conductive line, using the conductor indicated by a two-dot chain line Le2. The second sensing conductive line Le3 is electrically connected to an adjacent one of the arc-shaped groups of the conductors, as indicated by a two-dot chain line Le5 and referred to below as a third sensing conductive line, using the conductor (not shown in FIG. 3), as indicated by a two-dot chain line Le4 and diametrically opposed to the conductor Le2 across the center axis CA1 of the position change measuring device 1 which is aligned with the center axis of the heat flux sensor 10.

An upper half of the sensing conductive line which is formed by turning the arc-shaped groups of the conductors to the left and right sides, as viewed in FIG. 3, in the above away is electrically connected to an outermost one of the groups of the conductors, as indicated by a two-dot chain line Le6 and referred to below as an outermost sensing conductive line. The outermost sensing conductive line Le6 extends almost completely along an outer circumference of the heat flux sensor 10. The outermost sensing conductive line Le6 extends counterclockwise from the upper side to the lower side in FIG. 3.

The outermost sensing conductive line Le6 is electrically connected to a radially inwardly adjacent one of the arc-shaped groups of the conductors, as indicated by a two-dot chain line Le8, using the conductor, as indcted by a two-dot chain line Le7. Subsequently, the arc-shaped groups of the conductors are turned a plurality of times in the same way as that in which the upper half of the sensing conductive line to make a lower half of the sensing conductive line, as viewed in FIG. 3. The lower half of the sensing conductive line is finally electrically connected to an innermost one of the arc-shaped groups of the conductors, as indicated by a two-dot chain line Le9 which is separate from the innermost sensing conductive line Le1.

The terminal unit 102 is disposed in the center of the heat flux sensor 10. The terminal unit 102 is equipped with the connecting terminals 141 and 151, the connecting bumps 142 and 152, and the output lines 143 and 153.

The connecting terminals 141 and 151 are located near an outer circumference of the terminal unit 102. The connecting terminal 141 is electrically connected to the innermost sensing conductive line Le1 of the sensing conductive line which is located closest to the connecting terminal 141. The connecting terminal 151 is electrically connected to the innermost sensing conductive line Le9 of the sensing conductive line which is located closest to the connecting terminal 151.

The connecting bumps 142 and 152 are disposed on the connecting terminals 141 and 151, respectively. The connecting bump 142 connects between the connecting terminal 141 and the output line 143. The connecting bump 152 connects between the connecting terminal 151 and the output line 153.

The output lines 143 and 153 extend outwardly in the radial direction of the heat flux sensor 10. The output lines 143 and 153 are electrically connected to the connecting bumps 142 and 152. The output lines 143 and 153 pass through the semi-circular opening 103 of the terminal unit 102. Specifically, the output lines 143 and 153 extend from the surface of the heat flux sensor 10 facing the elastic member 23 to the surface of the heat flux sensor 10 facing the base member 21. After passing through the heat flux sensor 10 toward the base member 21, the output lines 143 and 153 are tied together into the cable 100 and mounted in the groove 212 of the base member 21. The cable 100 is in the form of a coaxial cable with the ground wire 104 of the heat flux sensor 10 disposed in the form of copper mesh around the output lines 143 and 153. The ground wire 104 is placed in contact with the base member 21 within the groove 212.

The heat flux sensor 10 is responsive to a change in quantity of heat flowing in the thickness-wise direction of the heat flux sensor 10 (i.e., a direction from the back-side protective member 12 to the front-side protective member 13 in FIG. 4) to produce a change in voltage developed at the first layer-to-layer connecting members 14 and the second layer-to-layer connecting members 15 which are alternately connected in series. The heat flux sensor 10 outputs such a voltage in the form of an output signal to the calculator 30 through the output lines 143 and 153.

The diaphragm unit 24 is disposed between the base member 21 and the press member 22. The diaphragm unit 24 includes the diaphragm 25, the base-side spacers 26 working as base-side attachments, and the press-side spacers 27 working as follower-side attachments.

The diaphragm 25 is of an annular shape and made of elastically deformable material such as stainless steel. The diaphragm 25 has the center hole 250 through which the elastic member 23 passes. In other words, the diaphragm 25 is located outside the elastic member 23 and surrounds the entire circumference of the elastic member 23.

The base-side spacers 26 are disposed between the base member 21 and the diaphragm 25. The position change measuring device 1 includes two base-side spacers 26 which will also be referred to below as a first and a second base-side attachment and are, as clearly illustrated in FIG. 5, diametrically opposed to each other across the center axis CA1 of the position change measuring device 1. The base-side spacers 26 are secured at ends thereof to the base member 21 using, for example, screws and at other ends thereof to portions 251 of the diaphragm 25 using, for example, screws, to hold the portions 251 of the diaphragm 25 from moving relative to the base member 21. In other words, the diaphragm 25 is firmed retained by the base member 21.

The press-side spacers 27 are disposed between the diaphragm 25 and the press member 22. The position change measuring device 1 is equipped with two press-side spacers 27 which will also be referred to below as a first and a second follower-side attachment and are, as can be seen in FIG. 5, diametrically opposed to each other across the center axis CA1 of the position change measuring device 1. The press-side spacers 27 are secured at ends thereof to the press member 22 using, for example, screws and at the other ends to the portions 252 of the diaphragm 25 which are separate from the portions 251 using, for example, screws. This holds the portions 252 of the diaphragm 25 from moving relative to the press member 22.

The position change measuring device 1 has the base-side spacers 26 and the press-side spacers 27 which are alternately arranged away from each other at equal intervals outside the heat flux sensor 10 and the elastic member 23 in the radial direction thereof. Specifically, the press-side spacers 27 are, as clearly illustrated in FIG. 5, located on the opposite sides of the center axis CA1 of the position change measuring device 1, in other words, the press-side spacers 27 and the center axis CA1 are aligned with each other along the line VL27. Similarly, the base-side spacers 26 are located on opposite sides of the center axis CA1 and aligned with each other along the line VL26 passing through the center axis CA1. The line VL27 extends substantially perpendicular to the line VL26.

The calculator 30 works as a position change determiner and is implemented by a known microcomputer equipped with a CPU, a ROM, and a ROM. The calculator 30 is electrically connected to the sensing conductive line using the cable 100. The calculator 30 analyzes the output signal from the heat flux sensor 10 to determine a rate of heat flux passing through the heat flux sensor 10. The calculator 30 calculates a change in position of the target object 90 as a function of the rate of heat flux passing through the heat flux sensor 10 or the heat flux sensor 40 which will be described later.

Figure 6:
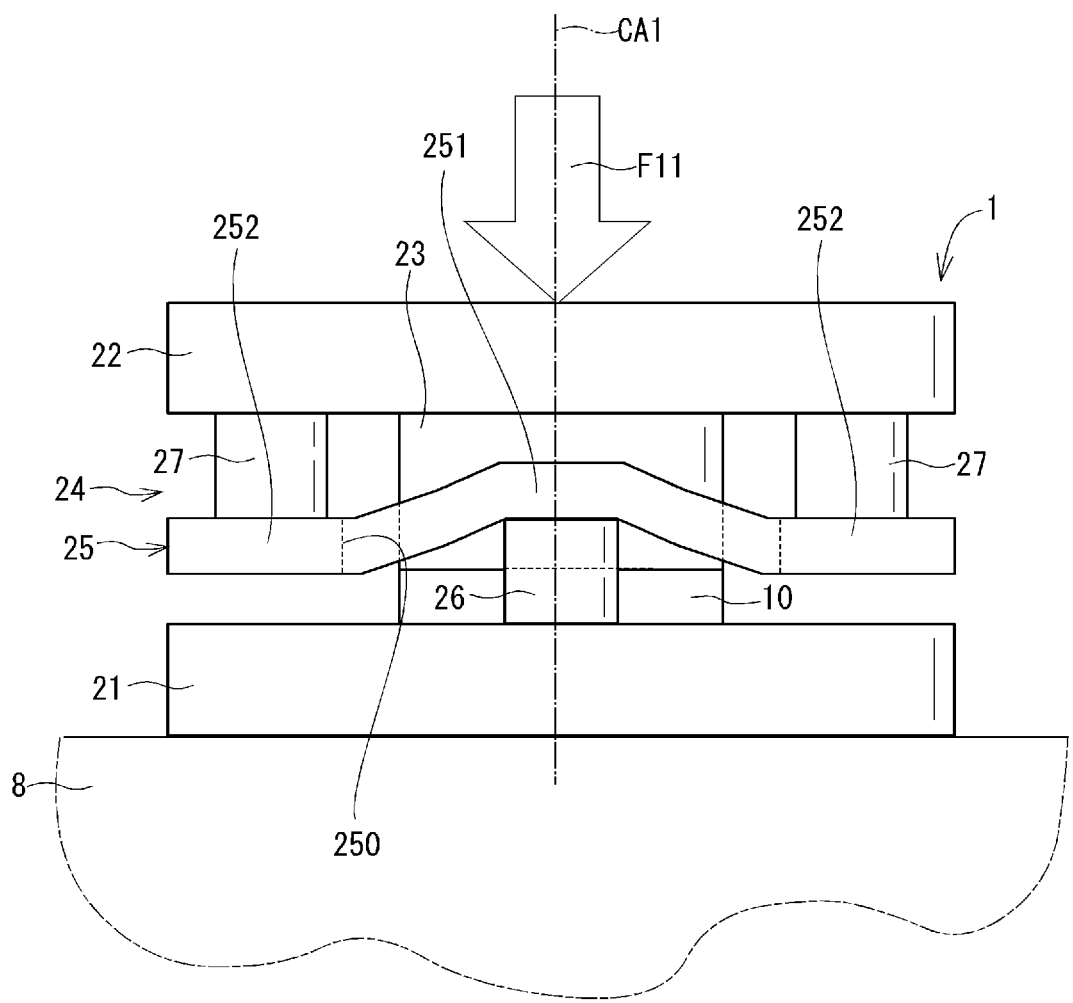
FIG. 6 is a schematic view which shows an operation of a position change measuring device according to the first embodiment.

The operation of the position change measuring device 1 in the first embodiment will be described below with reference to FIG. 6.

Figure 2:
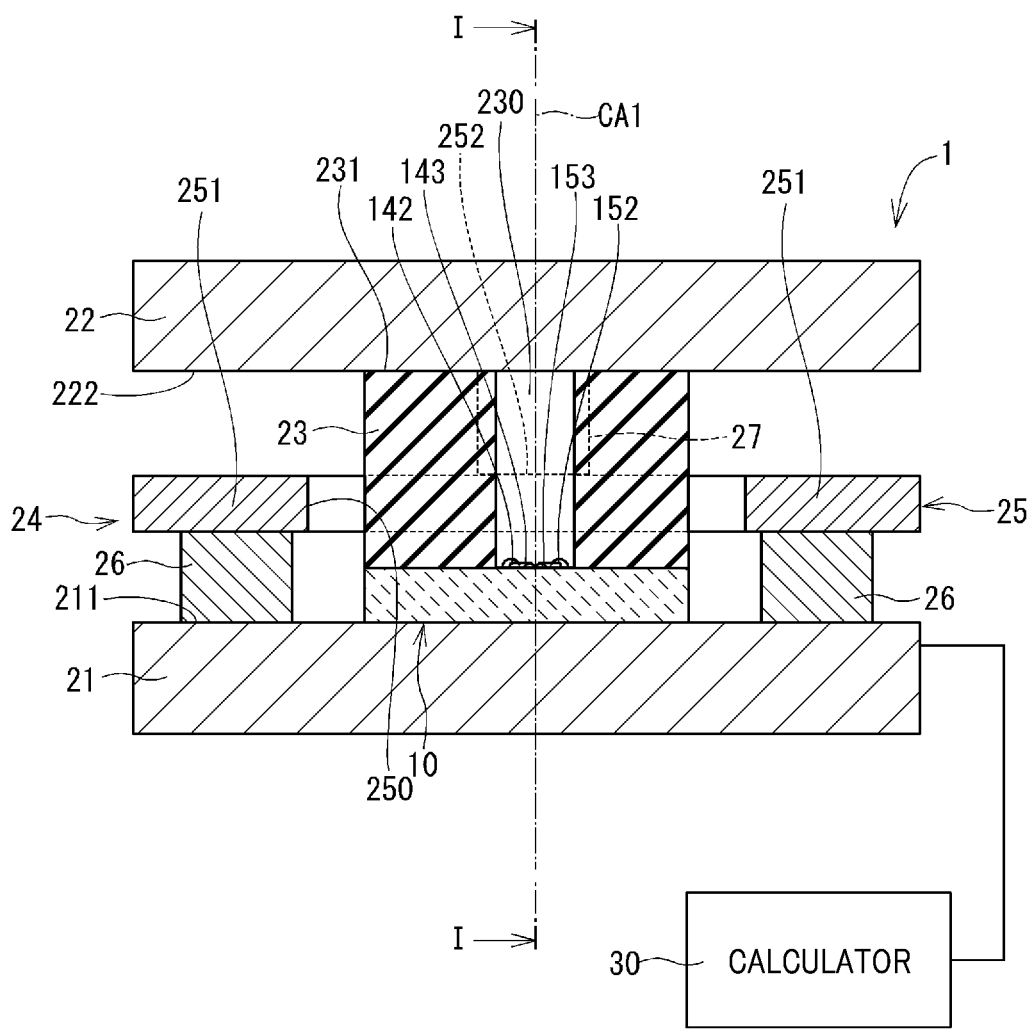
FIG. 2 is a sectional view taken along the line II-II in FIG. 1.

When external force F11 acts on the press member 22 of the position change measuring device 1 placed on the table 8, it will cause the press member 22 to be moved from the initial position, as illustrated in FIGS. 1 and 2, relative to the base member 21 or to be partially deformed. Such a change in relative position or deformation of the press member 22 results in deformation of the elastic member 23, so that the elastic member 23 produces or absorbs heat. When the elastic member 23 produces or absorbs heat, it generates heat flux that is a flow of thermal energy transferred inside or outside the elastic member 23. The heat flux sensor 10 outputs an electromotive force developed at the first layer-to-layer connecting members 14 and the second layer-to-layer connecting members 15 in the form of a voltage signal to the controller 30 through the output lines 143 and 153. The calculator 30 analyzes the output from the heat flux sensor 10 to determine the rate of heat flux passing through the heat flux sensor 10 and calculates a change in relative position or an amount of deformation of the press member 22 as a function of the rate of heat flux.

When the relative position or deformation of the press member 22 is changed, it causes the press-side spacers 27 to be moved, thereby moving the portions 252 of the diaphragm 25 to which the press-side spacers 27 are secured. The portions 251 of the diaphragm 25 to which the base-side spacers 26 are secured are, however, not moved, thus resulting in deformation of the diaphragm 25, as demonstrated in FIG. 6.

When the external force F11 disappears, it will cause the elastic member 23 to be recovered to have the initial size and shape thereof. This also causes the diaphragm 25 to produce resilience so that it is recovered to have the initial size and shape thereof. The elastic member 23 of the position change measuring device 1 is, therefore, recovered to the initial state thereof in a decreased period of time.

An example of use of the position change measuring device 1 in the first embodiment will be described below with reference to FIGS. 7 and 8.

FIG. 7 is a schematic view which demonstrates the position change measuring device 1 for the target object 90 that is an object whose change in position is measured. FIG. 8 is a graph which represents a change in output of the heat flux sensor 10 with time when the pusher 92 is installed on the mount member 91.

First, the structure of the target object 90 will be described below. The target object 90 is equipped with the mount member 91 and the pusher 92. In the target object 90, the pusher 92 is attached to the mount member 91.

The mount member 91 includes the mount body 911, the contact member 912, the small-diameter cylinder 913, and the large-diameter cylinder 914.

The mount body 911 is placed in contact with the surface 221 of the press member 22 of the position change measuring device 1 disposed on the table 8. The surface 221 of the press member 22 is farther away from the base member 21.

The contact member 912 is arranged on the opposite side of the mount body 911 to the position change measuring device 1. The contact member 912 has the contact surface 910 which is contactable with the pusher 92.

The small-diameter cylinder 913 is made of a bar having a circular cross section and located on the opposite side of the contact member 912 to the position change measuring device 1. The small-diameter cylinder 913 has an outer diameter smaller than an inner diameter of the hole 923 of the pusher 92.

The large-diameter cylinder 914 has a circular cross section and is arranged on the opposite side of the small-diameter cylinder 913 to the position change measuring device 1. The large-diameter cylinder 914 has an outer diameter substantially identical with the inner diameter of the hole 923 of the pusher 92.

The pusher 92 includes the pusher body 921 and a plurality of spring plungers 922.

The pusher body 921 is made of a hollow cylinder with a bottom. The pusher body 921 has formed therein the hole 923 into which the large-diameter cylinder 914 and the small-diameter cylinder 913 are insertable.

The spring plungers 922 are disposed in an outer periphery of the pusher body 921. Each of the spring plungers 922 includes the head pin 924 which is extendable into the hole 923. Specifically, the pin 924 is elastically pressed by the spring 925 inwardly in a radial direction of the pusher body 921.

The attachment of the pusher 92 to the mount member 91 is, as indicated by a solid line arrow Fa1 in FIG. 7, achieved by inserting the large-diameter cylinder 914 and the small-diameter cylinder 913 into the hole 923 of the pusher 92. In other words, the pusher 92 is fitted on the large-diameter portion 914 until the pusher body 912 reaches the contact surface 910 of the contact member 912.

When the large-diameter cylinder 914 is inserted into the hole 923 of the pusher 92, the pin 924 first contacts the outer circumferential wall 915 of the large-diameter cylinder 914 and then contacts the outer circumferential wall 916 of the small-diameter cylinder 913.

A time-series change in output of the heat flux sensor 10 when the pusher 92 is fitted on the mount member 91 will be described below.

Figure 8:
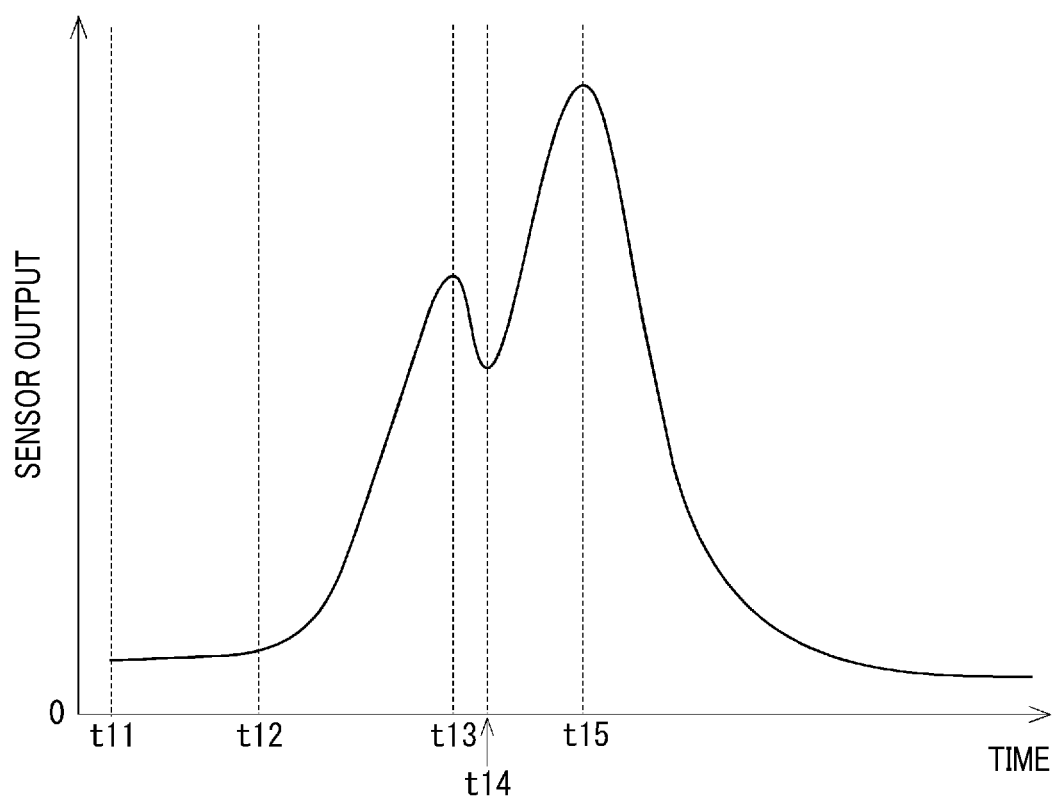
FIG. 8 is a graph of a characteristic representing an operation of a position change measuring device according to the first embodiment.

When the large-diameter cylinder 914 is inserted into the pusher 92 at time t11 in FIG. 8, the pin 924 contacts the outer circumferential wall 915 of the large-diameter cylinder 914. This causes the pressure, as produced by the spring 925, to act on the large-diameter cylinder 914. When the large-diameter cylinder 914 is further inserted into the pusher 92, the sensor output becomes greater than that at time t11, that is, increases between time t12 and time t13.

When the large-diameter cylinder 914 is further inserted into the pusher 92 at time t13, the head of the pin 924 moves from the outer circumferential wall 915 of the large-diameter cylinder 914 to the outer circumferential wall 916 of the small-diameter cylinder 913 in contact therewith. Since the outer diameter of the small-diameter cylinder 913 is, as described above, smaller than that of the large-diameter cylinder 914, the pressure, as exerted by the spring 925 on the mount member 91, decreases. This causes the sensor output to gradually decrease between time t13 and time t14 in FIG. 8.

When the large-diameter cylinder 914 is further inserted into the pusher 92 at time t14, the end surface 926 of the pusher body 921 which faces the position change measuring device 1 reaches or contacts the contact surface 910 of the contact member 912 which faces the pusher 92. This causes the sensor output to become higher than a given threshold Pth, e.g., reach a value Pm of the sensor output at time t15. The calculator 30 then determines that the pusher 92 has completely contacted the contact surface 910 of the contact member 912, that is, that the joining of the mount member 91 and the pusher 92 has been correctly achieved.

The position change measuring device 1 of the first embodiment offers the following advantages.

(a) The position change measuring device 1 includes the diaphragm unit 24 equipped with the diaphragm 25 which is made of elastically deformable material and discrete from the elastic member 23. When strain energy of the target object 90 is changed by application of external force thereto, it will cause the press member 22 of the position change measuring device 1 to be moved or deformed. The diaphragm 25 of the diaphragm unit 24 contracts or expands together with the elastic member 23 in response to the movement or deformation of the press member 22. When the external force disappears, it will cause the force of resilience created by elastic force of the diaphragm 25 to act on the press member 22 in addition to the force of resilience of the elastic member 23. This causes the position change measuring device 1 to be returned to the initial state in a short time. The position change measuring device 1 is, therefore, capable of sensing a change in position of the target object 90 at a high response rate.

The position change measuring device 1 is also designed to minimize undesirable movement or deformation of the press member 22 with aid of stiffness of both the diaphragm 25 and the elastic member 23 when external force is exerted on the press member 22 through the target object 90. This eliminates a risk that the press member 22 is undesirably moved or deformed when subjected to unwanted external force, thereby ensuring a high degree of accuracy in measuring a change in position of the target object 90.

The position change measuring device 1 is, therefore, capable of enhancing the response rate of sensing a change in position of the target object 90 using the resilience of the diaphragm 25 and also improving the accuracy in sensing such a position change using the resilience of the diaphragm 25.

(b) The position change measuring device 1 has the diaphragm 25 formed in an annular shape and the elastic member 23 inserted into the hole 250 of the diaphragm 25. These arrangements enable the diaphragm unit 24 to recover the size or shape of the elastic member 23 completely when external force acts on a portion of the position change measuring device 1 which is offset from the center axis CA1 to locally deform the elastic member 23. This ensures the stability in sensing a change in position of the target object 90 upon local exertion of force on the position change measuring device 1.

(c) The base-side spacers 26 and the press-side spacers 27 are, as described above, arranged alternately at equal interval away from each other outside the heat flux sensor 10 and the elastic member 23 in the radial direction thereof. This ensures the stability in deformation of the diaphragm 25 in response to a change in position of the press member 22, which achieves exertion of force of resilience of the diaphragm 25 on the press member 22, thereby enhancing the response rate at which the position change measuring device 1 senses a change in position of the target object 90 and the accuracy of such sensing.

(d) In the position change measuring device 1, the base member 21, the press member 22, the elastic member 23, the heat flux sensor 10, and the diaphragm unit 24 are assembled as a single unit. This keeps the locations of the elastic member 23 and the heat flux sensor 10 constant within the unit, thereby reproducibly sensing the movement or deformation of the press member 22.

(e) The press member 22 is, as described above, made of elastically deformable material. When the force F11 disappears after the elastic member 23 is deformed, the force of resilience of the pressure member 22 acts on the pressure member 22 itself in addition to the force of resilience of the elastic member 23, thereby accelerating the recovery of the position change measuring device 1 to the initial state thereof, which ensures the stability in repeatedly sensing the movement or deformation of the press member 22 in a short amount of time.

(f) The position change measuring device 1 is designed to have the base member 21 and the heat flux sensor 10 bonded together, the heat flux sensor 10 and the elastic member 23 bonded together, and the elastic member 23 and the press member 22 bonded together, thereby ensuring the stability of contraction or expansion of the elastic member 23 following the movement or deformation of the press member 22 adhered to the elastic member 23 and also assuring the ability of the heat flux sensor 10 to detect a change in heat flux arising from the contraction or expansion of the elastic member 23 adhered to the heat flux sensor 10. It, therefore, becomes possible to sense a small change in position of the target object 90 with high accuracy.

(g) The ground wire 104 of the heat flux sensor 10 is disposed in contact with the base member 21 within the groove 212, thereby eliminating the need for a portion of the target object 90 to which a ground wire is joined. The ground wire 104 is joined to the same portion of the position change measuring device 1 as that to which the heat flux sensor 10 is joined. In other words, the ground wire 104 is joined to the base 21 to which the heat flux sensor 10 (i.e., the cable 100) is joined, thereby minimizing electrical noise added to a voltage signal outputted from the heat flux sensor 10, which improves the accuracy in sensing a change in position of the target object 90.

Second Embodiment

Figure 9:
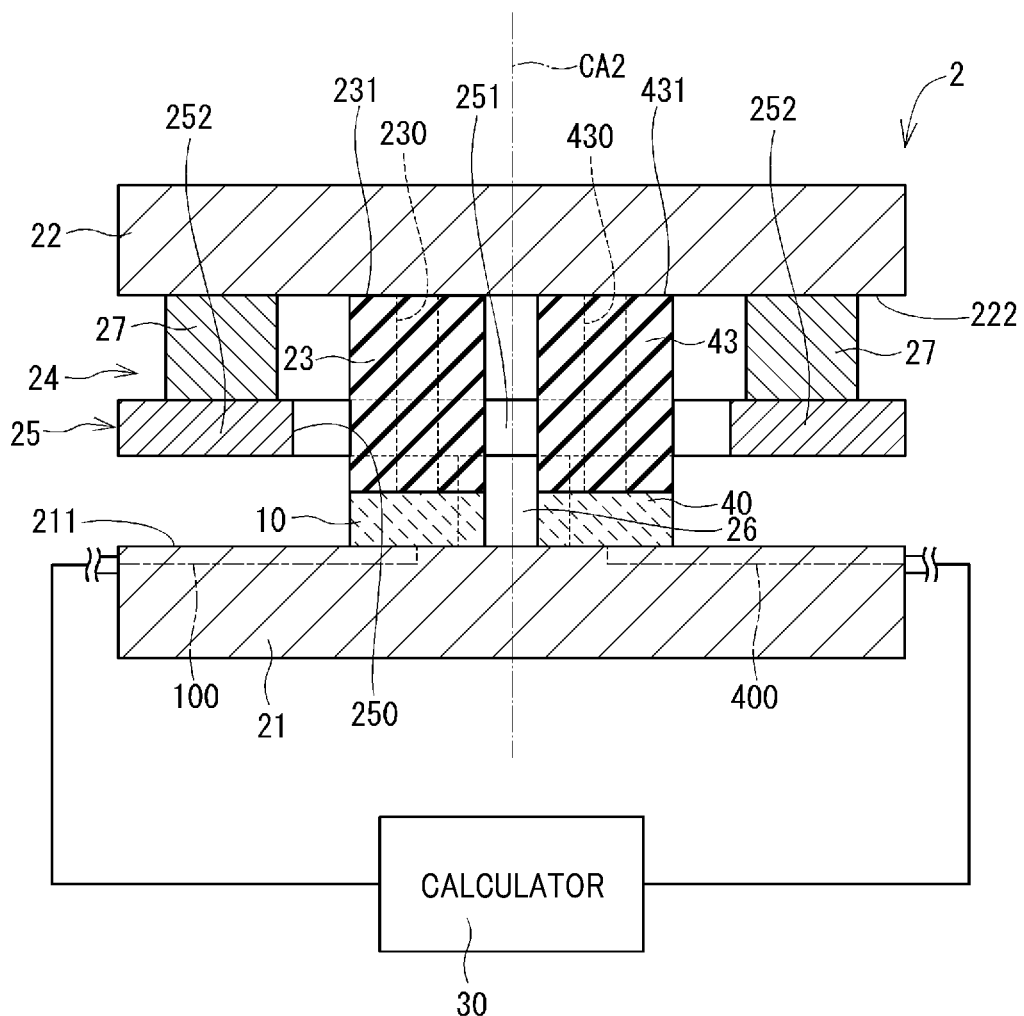
FIG. 9 is a longitudinal sectional view which illustrates a position change measuring device according to the second embodiment.
Figure 10:
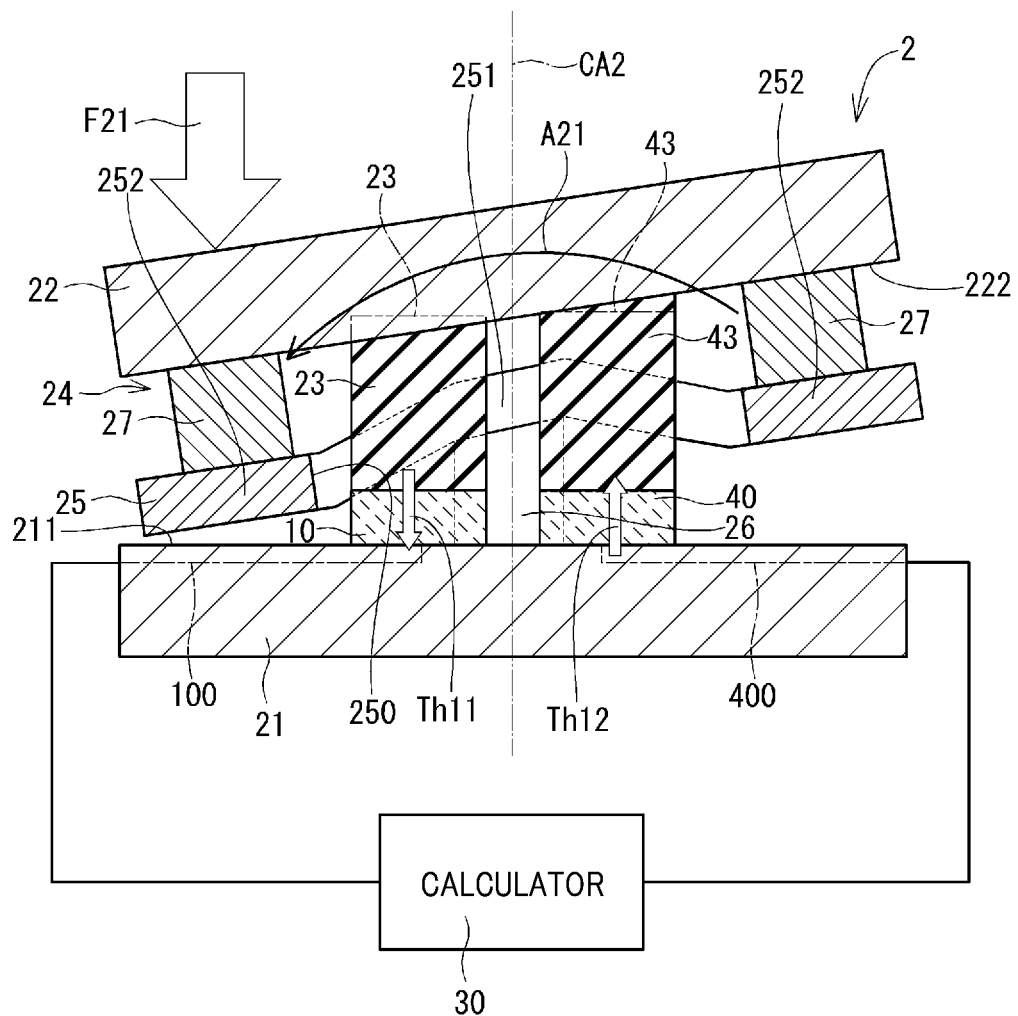
FIG. 10 is a schematic view which shows an operation of a position change measuring device according to the second embodiment.
Figure 11:
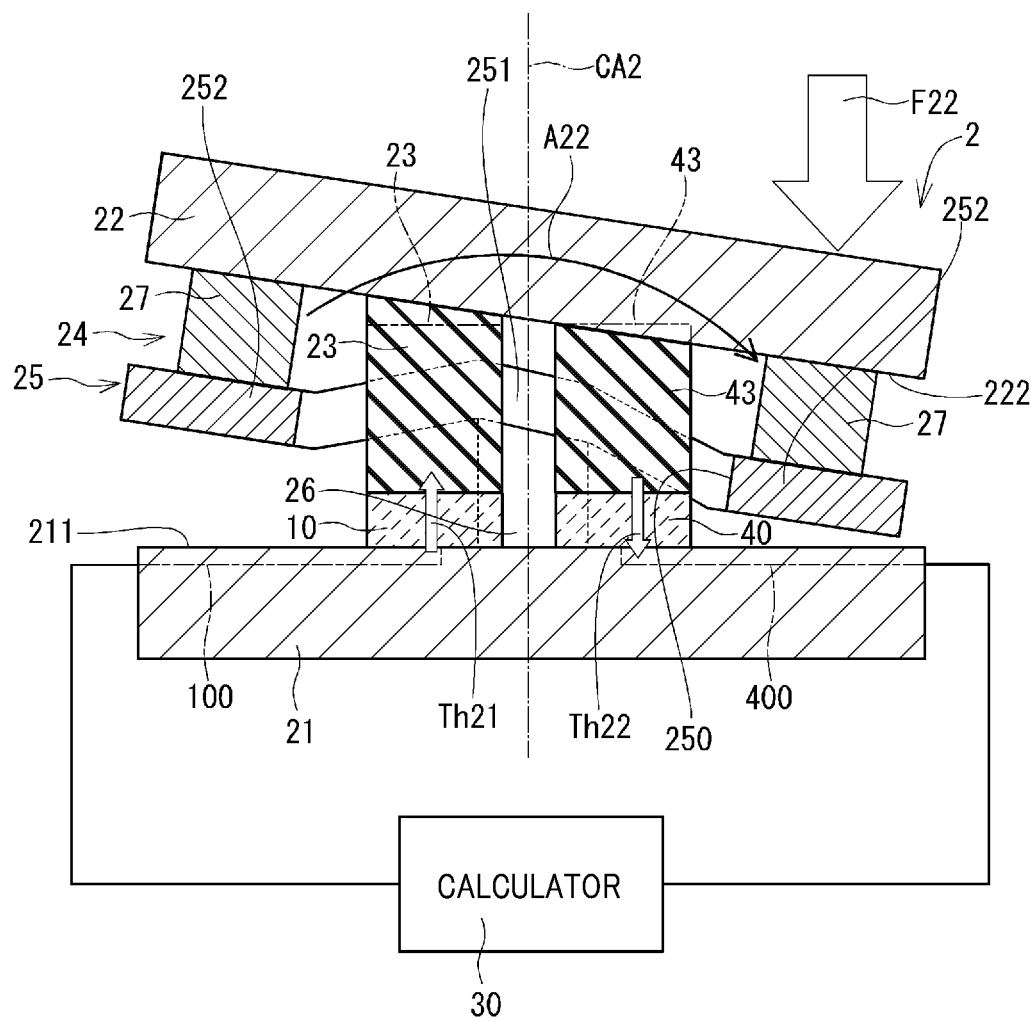
FIG. 11 is a schematic view which shows an operation of a position change measuring device which is different from in FIG. 10 according to the second embodiment.

FIGS. 9 to 11 illustrate the position change measuring device 2 according to the second embodiment which is different in number of heat flux sensors from the first embodiment. The same reference numbers as employed in the first embodiment will refer to the same parts, and explanation thereof in detail will be omitted here.

The position change measuring device 2 is equipped with the base member 21, the press member 22, the elastic members 23 and 43 working as expandable/contractable members, the heat flux sensors 10 and 40 (which will also be referred to below as a first and a second heat flux sensor), the diaphragm unit 24, and the calculator 30. FIGS. 9 to 11 are different in vertical and horizontal scale of the position change measuring device 2 from actual for ease of visibility.

The elastic member 43 is made of, for example, Viton rubber. The elastic member 43 is shaped in accordance with the shape of a sensing device of the heat flux sensor 40. Specifically, the elastic member 43 has formed therein the through-hole 430 which is, like the elastic member 23, contoured to the shape of the sensing device of the heat flux sensor 40. The elastic member 43 has the end surface 431 farther away from the base member 21 and is attached at the end surface 431 to the surface 222 of the press member 22 using, for example, adhesive. The elastic member 43 contracts or expands in response to movement or deformation of the press member 22. Specifically, when contracting, the elastic member 43 produces heat. Alternatively, when expanding, the elastic member 43 absorbs heat. The elastic members 23 and 43 are disposed in the hole 250 of the diaphragm 25.

The position change measuring device 2 is equipped with the two heat flux sensors 10 and 40. The heat flux sensors 10 and 40 are arranged on opposite sides of the center axis CA2 of the position change measuring device 2. The heat flux sensor 10 is located on the left side of the center axis CA2, as viewed in FIG. 9, while the heat flux sensor 40 is located on the right side of the center axis CA2.

The heat flux sensor 40 is disposed between the elastic member 43 and the base member 21. The heat flux sensor 40 is secured to the elastic member 43 and the base member 21 using, for example, adhesive.

The structure of the heat flux sensor 40 is identical with that of the heat flux sensor 10. The heat flux sensor 40 is in a circular shape. The heat flux sensor 40 works as a sensor to measure a heat flux that is a flow of thermal energy moving between inside and outside the elastic member 43. The heat flux sensor 40 works to measure the heat flux and output it in the form of an electrical voltage signal. The heat flux sensors 10 and 40 are electrically connected in parallel to the calculator 30. FIGS. 9 to 11 omit connecting terminals, connecting bumps, and output lines of the heat flux sensors 10 and 40, but also illustrate only the cables 100 and 400 electrically connecting the heat flux sensors 10 and 40 with the calculator 30.

The calculator 30 electrically connects with the heat flux sensors 10 and 40 independently. The calculator 30 receives outputs from the heat flux sensors 10 and 40 to calculate rates of heat fluxes passing through the heat flux sensors 10 and 40, respectively. The calculator 30 determines a change in position of the target object 90 as a function of the rates of heat fluxes passing through the heat flux sensors 10 and 40.

How to determine a change in position of the target object 90 by the position change measuring device 2 will be described below with reference to FIGS. 10 and 11. FIGS. 10 and 11 schematically illustrate the case where an external force acts on a portion of the position change measuring device 2 which is offset from the center axis CA2 of the position change measuring device 2. The shapes of the elastic members 23 and 43 when no external force acts on the position change measuring device 2 are indicated by two-dot chain lines 23 and 43 in FIGS. 10 and 11.

FIG. 10 demonstrates the case where external force F21 is exerted through the target object 90, not shown, on a portion of the position change measuring device 2 on the left side of the center axis CA2, as viewed in the drawing. The exertion of the external force F21 on the position change measuring device 2 causes the press member 22 to be inclined left, as shown by the solid arrow A21 in FIG. 10, so that the elastic member 23 contracts and produces heat. This causes the heat flux Th11, as indicated by a white arrow in FIG. 10 and developed by the heat of the elastic member 23, to pass through the heat flux sensor 10. The heat flux sensor 10 then outputs a voltage signal as a function of the rate of the heat flux Th11.

Conversely, the elastic member 43, as can be seen in FIG. 10, expands to absorb ambient thermal energy or heat. This causes the heat flux Th12, as indicate by a white arrow in FIG. 10 and developed by the heat absorbed by the elastic member 43, to pass through the heat flux sensor 40. The heat flux sensor 40 then outputs a voltage signal as a function of the rate of the heat flux Th12.

The calculator 30 analyzes the voltage signals outputted from the heat flux sensors 10 and 40 to calculate a change in position of the target object 90. Specifically, the heat flux sensor 10 determines the rate of the heat flux resulting from the generation of heat in the elastic member 23, while the heat flux sensor 40 determines the rate of the heat flux resulting from the absorption of heat in the elastic member 43. For instance, when the voltage signal inputted from the heat flux sensor 10 into the calculator 30 is positive (+) in sign, the voltage signal inputted from the heat flux sensor 40 into the calculator 30 will be negative (−) sign. The calculator 30 analyzes the polarities of the voltage signals from the heat flux sensors 10 and 40 to determine the orientation or inclination of the target object 90 relative to the base member 21. Specifically, the calculator 30 concludes that the target object 90 (i.e., the press member 22) has been inclined left as viewed in the drawing. The calculator 30 may also derive the sum of absolute values of the voltage signals outputted form the heat flux sensors 10 and 40 to derive a change in position of the target object 90 relative to the base member 21. In this case, the sum of the absolute values of the voltage signals is two times each of the absolute values of the voltage signals, thus enhancing the sensitivity of the calculator 30 to determine a change in position of the target object 90.

FIG. 11 demonstrates the case where external force F22 is exerted through the target object 90, not shown, on a portion of the position change measuring device 2 on the right side of the center axis CA2, as viewed in the drawing. The exertion of the external force F22 on the position change measuring device 2 causes the press member 22 to be inclined right, as shown by the solid arrow A22 in FIG. 11, so that the elastic member 23 expands and absorb ambient heat. This causes the heat flux Th21, as indicated by a white arrow in FIG. 11 and developed by the heat absorbed by the elastic member 23, to pass through the heat flux sensor 10. The heat flux sensor 10 then outputs a voltage signal as a function of the rate of the heat flux Th21.

Conversely, the elastic member 43, as can be seen in FIG. 11, contracts to produce heat. This causes the heat flux Th22, as indicate by a white arrow in FIG. 11 and developed by the heat produced by the elastic member 43, to pass through the heat flux sensor 40. The heat flux sensor 40 then outputs a voltage signal as a function of the rate of the heat flux Th22.

In the case of FIG. 11, the voltage signal inputted from the heat flux sensor 10 into the calculator 30 is negative (−) in sign, while the voltage signal inputted from the heat flux sensor 40 into the calculator 30 is positive (+) in sign. The calculator 30 analyzes the polarities of the voltage signals from the heat flux sensors 10 and 40 to determine the orientation or inclination of the target object 90 relative to the base member 21. Specifically, the calculator 30 concludes that the target object 90 (i.e., the press member 22) has been inclined right as viewed in the drawing. The calculator 30 may also derive the sum of absolute values of the voltage signals outputted form the heat flux sensors 10 and 40 to derive a change in position of the target object 90 relative to the base member 21. In this case, the sum of the absolute values of the voltage signals is two times each of the absolute values of the voltage signals, thus enhancing the sensitivity of the calculator 30 to determine a change in position of the target object 90.

The position change measuring device 2 in the second embodiment has the elastic members 23 and 43 which are disposed inside the hole 250 of the diaphragm 25. The position change measuring device 2, therefore, offers substantially the same beneficial effects as in the first embodiment.

In the position change measuring device 2, the heat flux sensors 10 and 40 are diametrically opposed to each other through the center axis CA2 of the position change measuring device 2. The voltage signals produced by the heat flux sensors 10 and 40 represent the rates and directions of heat fluxes in the elastic members 23 and 43, respectively. This enables the calculator 30 to use the voltage signals from the heat flux sensors 10 and 40 not only to determine a change in position of the target object 90 in a direction of the center axis CA2, but also to calculate a change in position of the target object 90 in a direction in which the heat flux sensors 10 and 40 are aligned with each other.

When an external force, like the force F21 or F21 in FIG. 10 or 11, is exerted on a portion of the position change measuring device 2 which is offset from the center axis CA2, the heat flux sensors 10 and 40 output voltage signals which are different in polarity from each other. A combination of absolute values of the voltage signals inputted from the heat flux sensors 10 and 40 into the calculator 30 will, thus, be two times each of the absolute values of the voltage signals. This enables the position change measuring device 2 to finely calculate a change in position of the target object 90.

Third Embodiment

Figure 12:
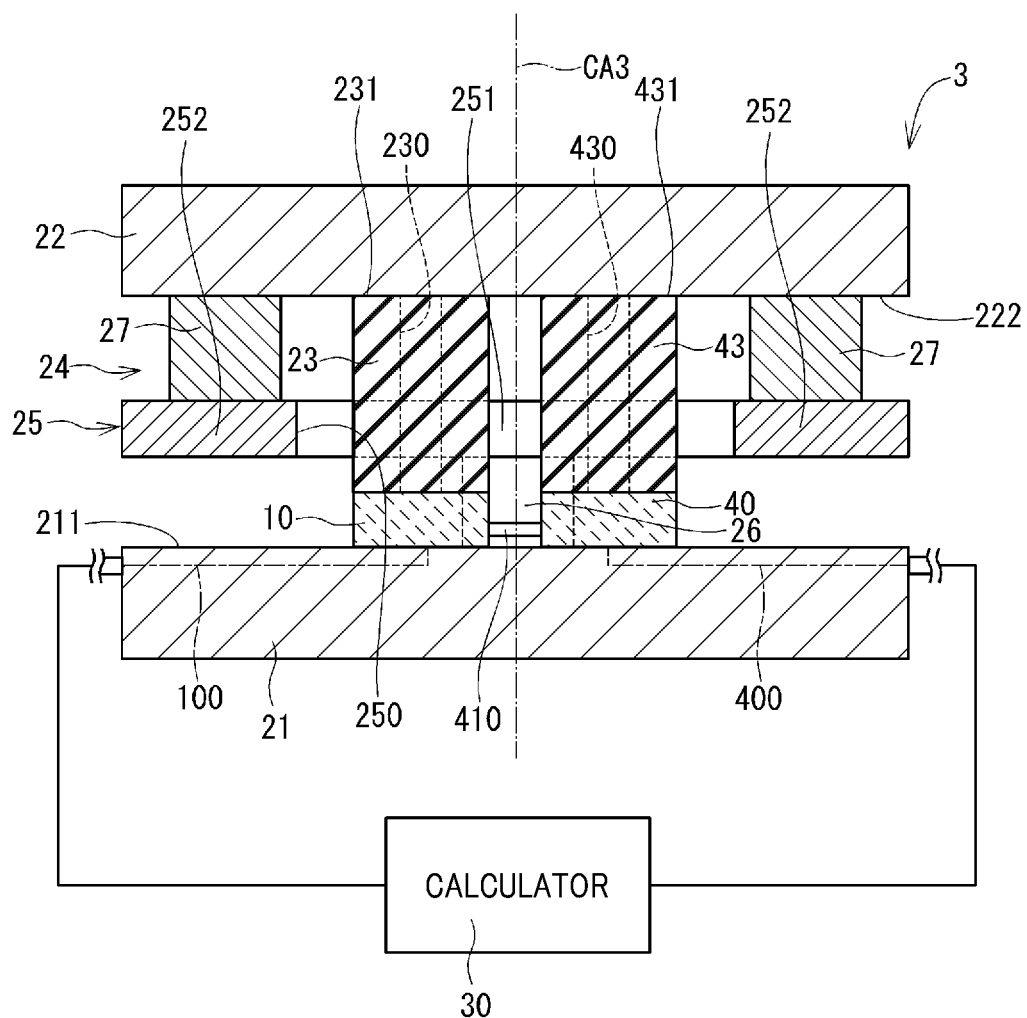
FIG. 12 is a longitudinal sectional view which illustrates a position change measuring device according to the third embodiment.

FIG. 12 illustrates the position change measuring device 3 according to the third embodiment which is different in connection of the heat flux sensors 10 and 40 to the calculator 30 from the second embodiment. The same reference numbers as employed in the second embodiment will refer to the same parts, and explanation thereof in detail will be omitted here.

The position change measuring device 3 is equipped with the base member 21, the press member 22, the elastic members 23 and 43 working as expandable/contractable members, the heat flux sensors 10 and 40, the diaphragm unit 24, and the calculator 30. FIG. 12 is different in vertical and horizontal scale of the position change measuring device 2 from actual for ease of visibility.

The position change measuring device 3 has the cable 410 which electrically connects the heat flux sensors 10 and 40 together which are located on opposite sides of the center axis CA3 of the position change measuring device 3.

The cable 410, as clearly illustrated in FIG. 12, directly connects between the heat flux sensor 10 and the heat flux sensor 40, so that a voltage signal, as outputted from, for example, the heat flux sensor 10, is inputted to the calculator 30 through the heat flux sensor 40. In other words, the heat flux sensors 10 and 40 are connected in series with the calculator 30, so that a single voltage signal is inputted to the calculator 30.

The position change measuring device 3 in the third embodiment has the elastic members 23 and 43 which are disposed inside the hole 250 of the diaphragm 25. The position change measuring device 3, therefore, offers substantially the same beneficial effects as in the first embodiment.

The sum of voltage signals produced by the heat flux sensor 10 and the heat flux sensor 40 is inputted to the calculator 30. For example, the heat flux sensors 10 and 40 may be electrically connected so that the polarities of the voltage signals outputted therefrom are oriented in the same direction. This results in enhanced sensitivity to detect a change in inclination of the target object 90.

Fourth Embodiment

Figure 13:
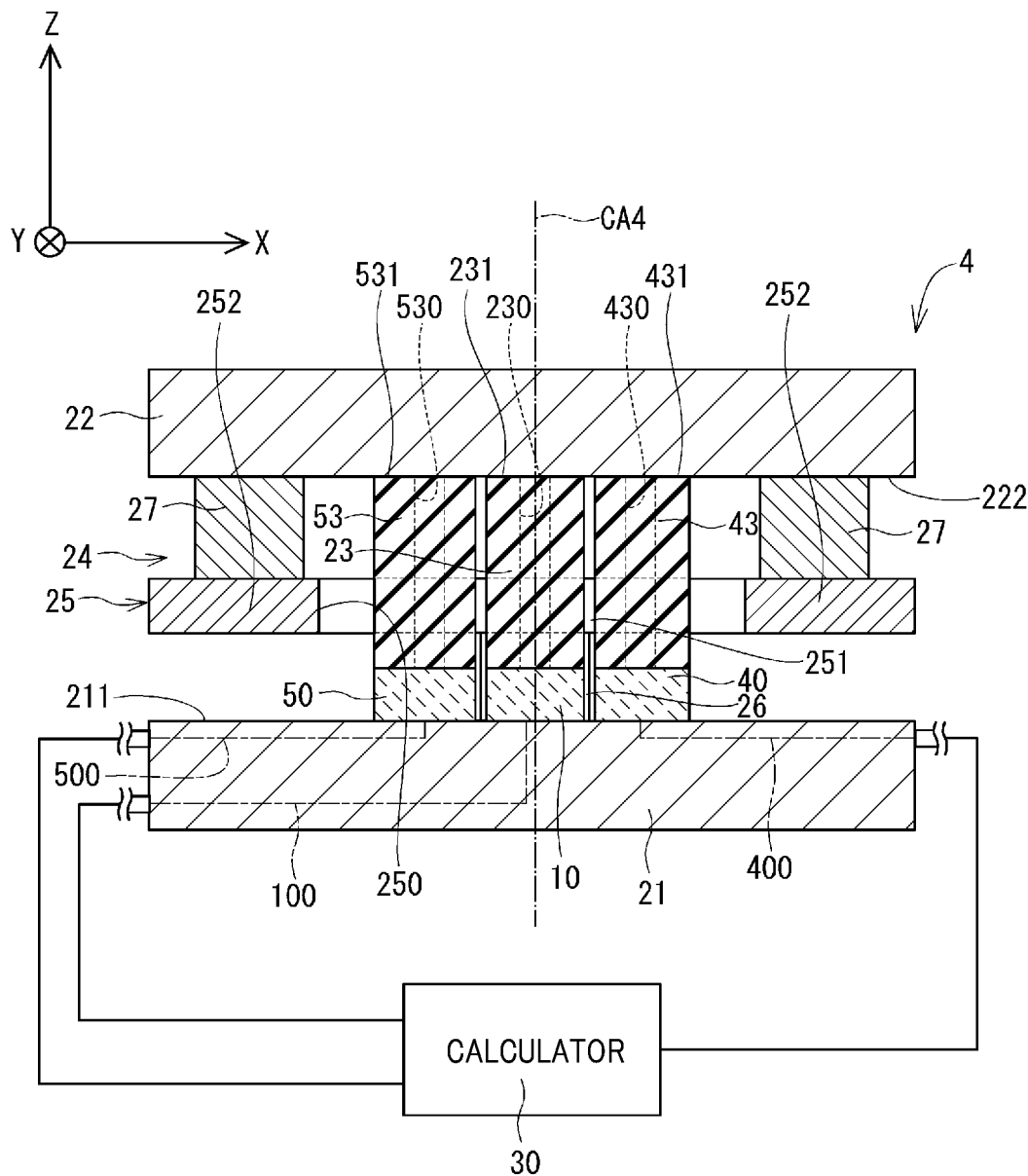
FIG. 13 is a longitudinal sectional view which illustrates a position change measuring device according to the fourth embodiment.
Figure 14:
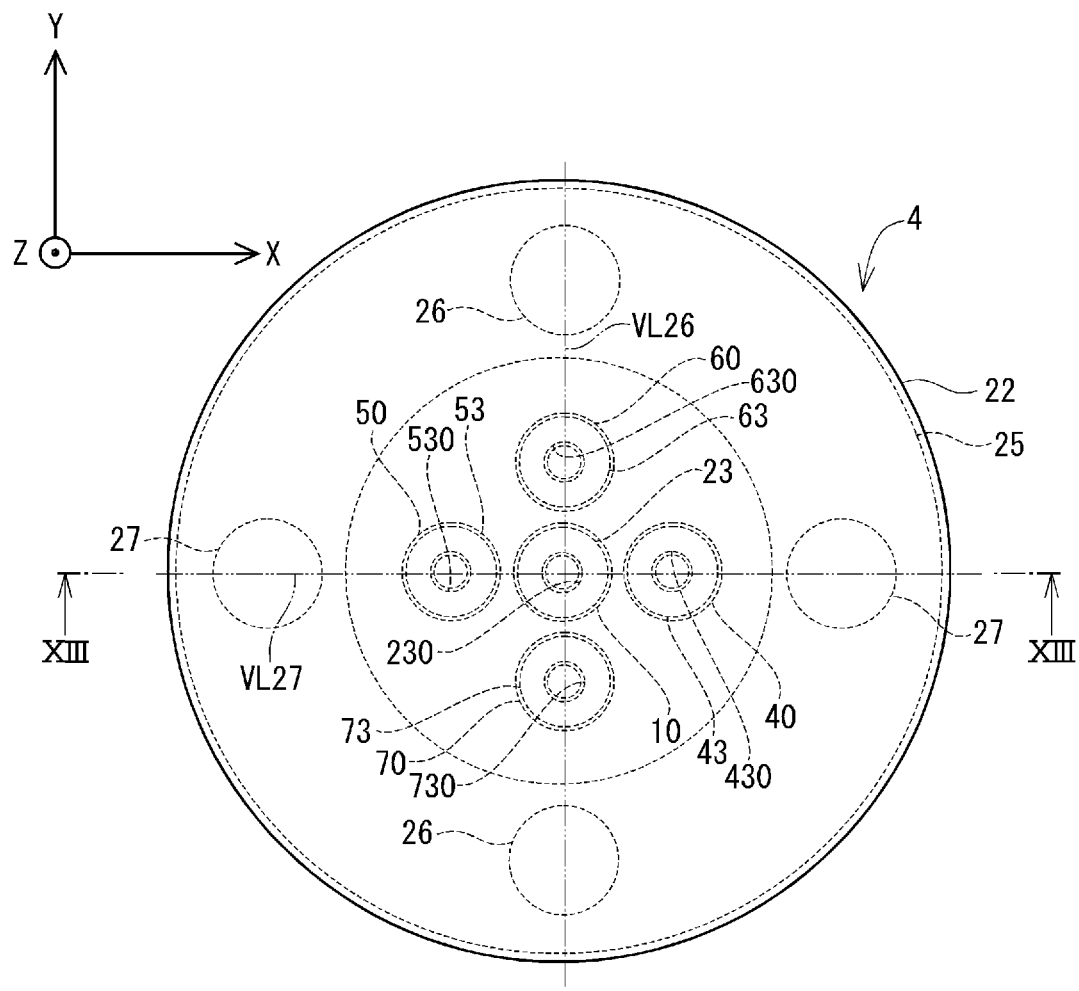
FIG. 14 is a top view which illustrates a position change measuring device according to the fourth embodiment.

FIGS. 13 and 14 illustrate the position change measuring device 4 according to the fourth embodiment which is different in number of heat flux sensors from the first embodiment. The same reference numbers as employed in the first embodiment will refer to the same parts, and explanation thereof in detail will be omitted here.

The position change measuring device 4 includes the base member 21, the press member 22, the elastic members 23, 43, 53, 63, and 73 working as expandable/contractable members, the heat flux sensors 10, 40, 50, 60, and 70 (which will also be referred to as a first, a second, a third, a fourth, and a fifth heat flux sensor), the diaphragm unit 24, and the calculator 30. FIG. 13 is different in vertical and horizontal scale of the position change measuring device 4 from actual for ease of visibility. For the sake of convenience, in FIGS. 13 and 14, a direction perpendicular to the center axis CA4 of the position change measuring device 4 is defined as a direction x. A direction perpendicular to both the center axis CA4 and the direction x is defined as a direction y. A direction oriented parallel to the center axis CA4 is defined as a direction z.

The position change measuring device 4 is equipped with the heat flux sensor 10 which will also be referred to below as a first heat flux sensor, the heat flux sensor 40 which will also be referred to below as a second heat flux sensor, the heat flux sensor 50 which will also be referred to below as a third heat flux sensor, the heat flux sensor 60 which will also be referred to below as a fourth heat flux sensor, and the heat flux sensor 70 which will also be referred to below as a fifth heat flux sensor The heat flux sensor 10 is, as clearly illustrated in FIG. 13, disposed on the center axis CA4 of the position change measuring device 4. The heat flux sensors 40, 50, 60, and 70 are arranged around the heat flux sensor 10.

The heat flux sensor 40 is, as can be seen in FIG. 14, located away from the heat flux sensor 10 in the direction x. The heat flux sensor 40 electrically connects with the calculator 30 through the cable 400. The elastic member 43 is disposed between the heat flux sensor 40 and the press member 22. The elastic member 43 has the surface 431 farther away from the base member 21 and is attached at the surface 431 to the press member 22 and at the opposite surface to the heat flux sensor 40 using, for example, adhesive.

The heat flux sensor 50 is, as can be seen in FIG. 14, located away from the heat flux sensor 10 in a direction opposite the direction x. In other words, the heat flux sensors 50, 10, and 40 are aligned with each other in the radial direction of the position change measuring device 4 (i.e., along an imaginary axis x extending in the direction x). The imaginary axis x will also be referred to below as a first imaginary line defined to pass through the centers of the heat flux sensors 50, 10, and 40. The heat flux sensor 50 is attached to the base member 21 using, for example, adhesive. The heat flux sensor 50 is electrically connected to the calculator 30 through the cable 500. The elastic member 53 made of, for example, Viton rubber is disposed between the heat flux sensor 50 and the press member 22. Specifically, the elastic member 53 has the surface 531 farther away from the base member 21 and is joined at the surface 531 to the press member 22 and at the other surface to the heat flux sensor 50 using, for example, adhesive. The elastic member 53 has formed therein the through-hole 530 which is, like the elastic member 23, contoured to the shape of a sensing device of the heat flux sensor 50.

The heat flux sensor 60 is, as can be seen in FIG. 14, located away from the heat flux sensor 10 in the direction y. The heat flux sensor 60 is joined to the base member 21 using, for example, adhesive. The heat flux sensor 60 electrically connects with the calculator 30 using a cable, not shown. The elastic member 63 made of, for example, Viton rubber is disposed between the heat flux sensor 60 and the press member 22. The elastic member 63 has a surface farther away from the base member 21 and is joined at such a surface to the press member 22 and at the other surface to the heat flux sensor 60 using, for example, adhesive. The elastic member 63 has formed therein the through-hole 630 which is, like the elastic member 23, contoured to the shape of a sensing device of the heat flux sensor 60.

The heat flux sensor 70 is, as can be seen in FIG. 14, located away from the heat flux sensor 10 in a direction opposite the direction y. The heat flux sensor 70 is joined to the base member 21 using, for example, adhesive. The heat flux sensor 70 is electrically connected to the calculator 30 through a cable, not shown. In other words, the heat flux sensors 70, 10, and 60 are aligned with each other in the radial direction of the position change measuring device 4 perpendicular to the direction x (i.e., along an imaginary axis y extending in the direction y). The imaginary axis y will also be referred to below as a second imaginary line defined to pass through the centers of the heat flux sensors 70, 10, and 60 perpendicular to the imaginary axis x. The elastic member 73 made of, for example, Viton rubber is disposed between the heat flux sensor 70 and the press member 22. The elastic member 73 has a surface farther away from the base member 21 and is joined at such a surface to the press member 22 and at the other surface to the heat flux sensor 70 using, for example, adhesive. The elastic member 73 has formed therein the through-hole 730 which is, like the elastic member 23, contoured to the shape of a sensing device of the heat flux sensor 70.

The elastic members 23, 43, 53, 63, and 73 are disposed in the hole 250 of the diaphragm 25 of the diaphragm unit 24.

The calculator 30 electrically connects with the heat flux sensors 10, 40, 50, 60, and 70 independently. The calculator 30 analyzes voltage signals outputted from the respective heat flux sensors 10, 40, 50, 60, and 70 to determine rates of heat fluxes passing through the heat flux sensors 10, 40, 50, 60, and 70. The calculator 30 then calculates a change in position of the target object 90 as a function of the rates of heat fluxes passing through the heat flux sensors 10, 40, 50, 60, and 70.

The position change measuring device 4 in the fourth embodiment has five elastic members: the elastic members 23, 43, 53, 63, and 73 which are disposed inside the hole 250 of the diaphragm 25. The position change measuring device 4, therefore, offers substantially the same beneficial effects as in the first embodiment.

The position change measuring device 4 has four additional heat flux sensors: the heat flux sensors 40, 50, 60, and 70 arranged around the heat flux sensor 10 at equal angular intervals away from each other. In other words, the heat flux sensors 50, 10, and 40 are, as described above, arranged in alignment with each other along the imaginary axis x, thereby enabling the calculator 30 to compare between the rates of heat flux passing through the heat flux sensors 50, 10, and 40 to determine a change in position or inclination of the target object 90 in a direction perpendicular to the imaginary axis x. Additionally, the heat flux sensors 70, 10, and 60 are aligned with each other along the imaginary axis y, thereby enabling the calculator 30 to compare between the rates of heat flux passing through the heat flux sensors 70, 10, and 60 to determine a change in position or inclination of the target object 90 in a direction perpendicular to the imaginary axis y. The calculator 30 may compare among the voltage signals outputted from all the heat flux sensors 40, 50, 60, and 70 to derive a change in area or portion of the press member 22 to which the external force is applied through the target object 90.

As apparent from the above discussion, the position change measuring device 4 uses the heat flux sensors 10, 40, 50, 60, and 70 to determine changes in position or orientation of the target object 90 in a direction along the axis z of the target object 90 (i.e., the center axis CA4 of the position change measuring device 1), in the direction along the imaginary axis x, and in the direction along the imaginary axis y. The position change measuring device 4 is, therefore, capable of measuring a change in position or orientation of the target object 90 with an increased accuracy.

Modifications

The heat flux sensor(s) used in the above embodiments is shaped to be circular, but may be designed in another shape.

Figure 15:
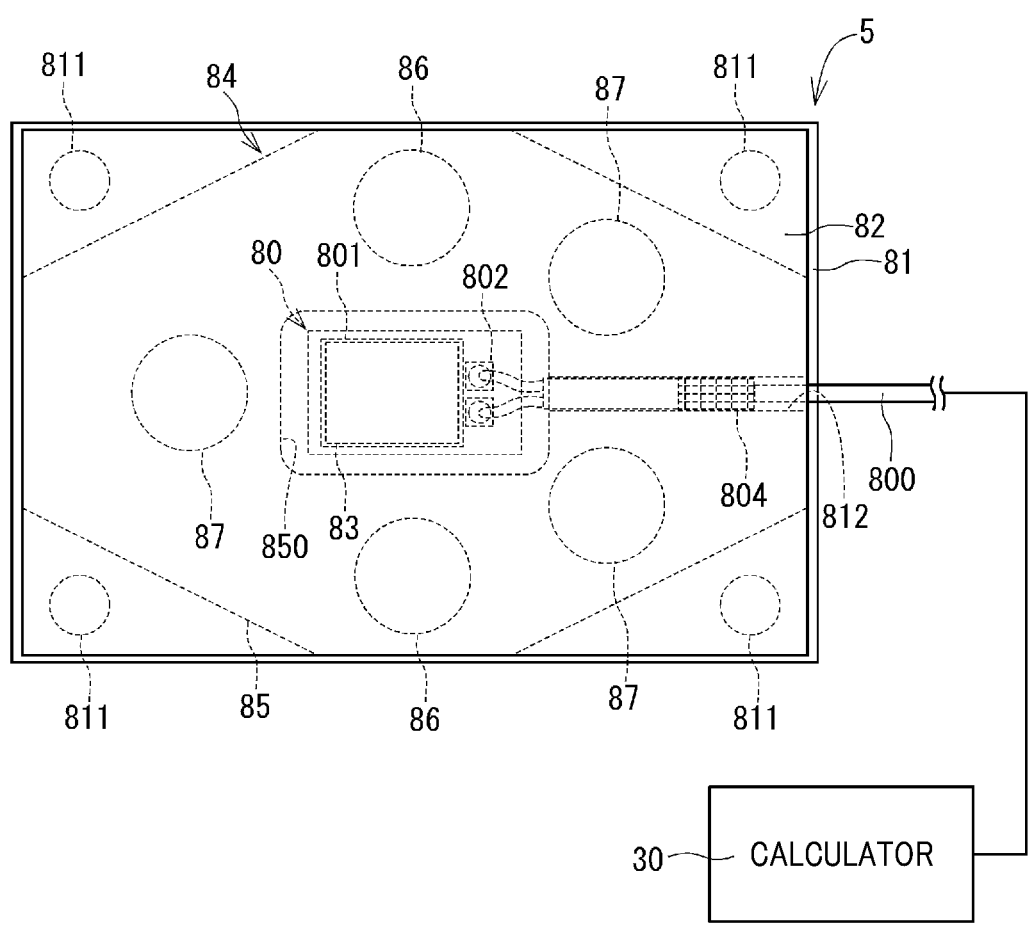
FIG. 15 is a schematic view which illustrates a modification of a position change measuring device.

FIG. 15 is a top view which illustrates the position change measuring device 5 equipped with the rectangular heat flux sensor 80. The position change measuring device 5 includes the base member 81, the press member 82 working as a follower, the elastic member 83 serving as an expandable/contractable member, the heat flux sensor 80, the diaphragm unit 84 working as a resilience force generator, and the calculator 30.

The base member 81 is made of an electrically conductive material in a rectangular shape. The base member 81 is equipped with a plurality of bolts 811 for use in attaching the base member 81 to a table, not shown.

The press member 82 is made of an electrically conductive elastically deformable material and formed in a rectangular shape.

The elastic member 83 is made of, for example, Viton rubber and formed in a rectangular shape similar to the configuration of the sensing device 801 of the heat flux sensor 80. The elastic member 83 is joined to the press member 82 and the heat flux sensor 80 using, for example, adhesive.

The heat flux sensor 80 is disposed between the elastic member 83 and the base member 81. The heat flux sensor 80 is attached to the base member 81 using, for example, adhesive. The heat flux sensor 80 has a rectangular outline. The heat flux sensor 80 is equipped with the sensing device 801 and the terminal unit 802.

The sensing device 801 is equipped with a sensing conductive line, not shown, which is connected at two points to the terminal unit 802. The terminal unit 802 is equipped with the cable 800 having an assembly of two output lines leading to the sensing conductive line. The cable 800 is disposed in the groove 812 formed in the base member 81. The cable 800 is equipped with the ground wire 804 disposed in contact with the base member 81 within the groove 812.

The diaphragm unit 84 is disposed between the base member 81 and the press member 82. The diaphragm unit 84 includes the diaphragm 85, the base-side spacers 86 working as base-side attachments, and the press-side spacers 87 working as follower-side attachments.

The diaphragm 25 is of an annular shape and made of elastically deformable material such as stainless steel. The diaphragm 25 has the center hole 250 through which the elastic member 23 passes. In other words, the diaphragm 25 is located outside the elastic member 23 and surrounds the entire circumference of the elastic member 23.

The diaphragm 85 is formed in an annular octagon shape. The diaphragm 85 is made of elastically deformable material, such as stainless steel. The diaphragm 85 has the elastic member 83 disposed in the central through-hole 850.

The base-side spacers 86 are, like in the above embodiments, disposed between the base member 81 and the diaphragm 85. In the position change measuring device 5, the two base-side spacers 86 are located on opposite sides of the heat flux sensor 80 and the elastic member 83. In other words, the base-side spaces 86 are opposed to each other across an assembly of the heat flux sensor 80 and the elastic member 83. Each of the base-side spacers 86 is secured at an end thereof to the base member 81 and at the other end thereof to the diaphragm 25, thereby holding the diaphragm 25 from moving relative to the base member 81.

The press-side spacers 87 are disposed between the diaphragm 85 and the press member 82. The position change measuring device 5 has the three press-side spacers 87 arranged around the assembly of the heat flux sensor 80 and the elastic member 83. Each of the press-side spacers 87 is secured at an end thereof to the press member 82 and at the other end thereof to the diaphragm 25, thereby holding the diaphragm 25 from moving relative to the press member 82.

The position change measuring device 5 in FIG. 15 offers substantially same beneficial advantages as those in the first embodiment.

In the above embodiments, the diaphragm is designed to fully surround the elastic member(s) in the circumferential direction of the diaphragm, but however, it may be formed into another shape which partially surrounds the elastic member(s) as long as after contracting or being deformed, the elastic member(s) will be recovered to its initial state.

In the above embodiments, the diaphragm unit includes the diaphragm producing the force of resilience, the base-side spacers securing the diaphragm to the base member, and the press-side spacers securing the diaphragm to the press member, but however, it may alternatively be designed to have another structure.

In the above embodiments, the base-side spacers and the press-side spacers are arranged alternately at equal intervals away from each other around the heat flux sensor(s) and the elastic member(s), but however, they may be arranged in another positional relation.

The position change measuring device in each embodiment is, as described above, equipped with a single, two, or five heat flux sensors, but may alternatively designed to have another number of heat flux sensors. The number of the elastic members is identical with that of the heat flux sensors, but it is not limited to such a number.

In each embodiment, the joints between the press member and the elastic member, between the elastic member and the heat flux sensor, and between the heat flux sensor and the base member are achieved using adhesive, but may be accomplished in another way, for example, using bonding sheet as long as the elastic member will be deformed in response to deformation of the press member, and the heat flux sensor will detect transfer of heat arising from the deformation of the elastic member.

In each embodiment, the elastic member(s) is made of Viton rubber, but may alternatively be formed by material, such as another type of rubber, resin, or metal, which, when contracting, produces heat, and when expanding, absorbs heat.

The diaphragm is, as described above, made of stainless steel, but alternatively may be made of another type of elastically deformable material. The material of the diaphragm may be selected to change the stiffness of the position change measuring device. The position change measuring device may be engineered, as already described in the above item (a), to have a required degree of stiffness against external force exerted on the press member. This ensures the accuracy in measuring a change in position or orientation of the target object regardless of characteristics of the target object.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A position change measuring device which measures a change in position of a target object relative to a reference, comprising:
    a base which is held from moving relative to the reference;
    a follower which is moved following movement of the target object relative to the reference;
    an expandable/contractible member disposed between the base and the follower and made of material which contracts or expands in response to movement of the follower, the expandable/contractible member producing heat when contracting and absorbing heat when expanding;
    a heat flux sensor to which the heat is transferred from the expandable/contractible member and which outputs a signal as a function of a rate of heat flux that is a flow of thermal energy transferred to inside or outside from the expandable/contractible member; and
    a resilience force generator having a diaphragm made of elastically deformable material, first and second base-side attachments, and first and second follower-side attachments, the resilience force generator being disposed between the base and the follower, the first and second base-side attachments being secured to the diaphragm and to the base, the first and second follower-side attachments being secured to the diaphragm and to the follower;
    wherein:
    when the expandable/contractible member contracts or expands in response to the movement of the follower, the diaphragm of the resilience force generator is configured to produce a force of resilience in addition to a force of resilience exerted by the expandable/contractible member on the follower, to urge the follower to an initial state thereof;
    the diaphragm is shaped to fully surround an outer periphery of the expandable/contractible member and the heat flux sensor;
    at least a portion of the expandable/contractible member is located within a center hole of the diaphragm;
    the first and second base-side attachments are diametrically opposed from each other on opposite sides of a center axis of the position change measuring device that extends through the center hole of the diaphragm;
    the first and second follower-side attachments are diametrically opposed from each other on opposite sides of the center axis of the position change measuring device that extends through the center hole of the diaphragm; and
    the first and second follower-side attachments and the first and second base-side attachments are arranged alternately at equal intervals away from each other outside of the outer periphery of the expandable/contractible member in a radial direction around the center axis of the position change measuring device.

2. The position change measuring device as set forth in claim 1, wherein the heat flux sensor includes a first and a second heat flux sensors.

3. The position change measuring device as set forth in claim 2, further comprising a calculator which is electrically connected to the heat flux sensor and configured to determine the rate of the heat flux using the signal outputted from the heat flux sensor, and wherein the first and second heat flux sensors are connected in parallel to the calculator.

4. The position change measuring device as set forth in claim 2, further comprising a calculator which is electrically connected to the heat flux sensor and configured to determine the rate of the heat flux using the signal outputted from the heat flux sensor, and wherein the first and second heat flux sensors are connected in series with the calculator.

5. The position change measuring device as set forth in claim 1, wherein the heat flux sensor includes a first heat flux sensor, a second heat flux sensor, a third heat flux sensor, a fourth heat flux sensor, and a fifth heat flux sensor, wherein the second, third, fourth, and fifth heat flux sensors are arranged around the first heat flux sensor, wherein a first imaginary line defined to extend through a center of the second heat flux sensor and a center of the third heat flux sensor passes through a center of the first heat flux sensor, and a second imaginary line defined to extend through a center of the fourth heat flux sensor and a center of the fifth heat flux sensor passes through the center of the first heat flux sensor, and wherein the first and second imaginary line extend perpendicular to each other.

6. The position change measuring device as set forth in claim 1, wherein the follower is made of elastically deformable material.

7. The position change measuring device as set forth in claim 1, wherein the base and the heat flux sensor are adhered to each other, the heat flux sensor and the expandable/contractible member are adhered to each other, and the expandable/contractible member and the follower are adhered to each other.

* * * * *